United States Patent
Park et al.

(10) Patent No.: US 9,904,380 B2
(45) Date of Patent: Feb. 27, 2018

(54) METHOD FOR CONTROLLING ROTATION RECOGNITION UNIT OF ROTATING BODY AND ELECTRONIC DEVICE THEREOF

(71) Applicant: Samsung Electronics Co., Ltd., Gyeonggi-do (KR)

(72) Inventors: Hyung-Jin Park, Gyeonggi-do (KR); Hee-Young Yun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 173 days.

(21) Appl. No.: 15/056,170

(22) Filed: Feb. 29, 2016

(65) Prior Publication Data

US 2016/0252980 A1    Sep. 1, 2016

(30) Foreign Application Priority Data

Feb. 27, 2015    (KR) ................. 10-2015-0027856

(51) Int. Cl.
| | |
|---|---|
| *G06F 3/0362* | (2013.01) |
| *G01D 5/14* | (2006.01) |
| *G01D 5/28* | (2006.01) |
| *G01D 5/56* | (2006.01) |
| *G06F 1/32* | (2006.01) |
| *G06F 3/03* | (2006.01) |
| *G06F 1/16* | (2006.01) |
| *G01D 7/00* | (2006.01) |

(52) U.S. Cl.
CPC ........... *G06F 3/0362* (2013.01); *G01D 5/145* (2013.01); *G01D 5/28* (2013.01); *G01D 5/56* (2013.01); *G06F 1/163* (2013.01); *G06F 1/325* (2013.01); *G06F 1/3212* (2013.01); *G06F 1/3287* (2013.01); *G06F 3/0312* (2013.01); *G01D 7/007* (2013.01); *Y02B 60/1282* (2013.01); *Y02B 60/1292* (2013.01); *Y02B 60/32* (2013.01)

(58) Field of Classification Search
CPC ...... G06F 3/0362; G06F 3/0312; G06F 1/325; G06F 1/3212; G06F 1/3287
See application file for complete search history.

(56) References Cited

U.S. PATENT DOCUMENTS

| | | |
|---|---|---|
| 7,102,123 B2 | 9/2006 | Chin et al. |
| 7,417,422 B2 | 8/2008 | Kang |
| 7,425,825 B2 | 9/2008 | Kang |

(Continued)

*Primary Examiner* — Larry Sternbane
(74) *Attorney, Agent, or Firm* — The Farrell Law Firm, P.C.

(57) ABSTRACT

A device and method for controlling rotation recognition units that detect the rotation of a rotating body in an electronic device are presented. The electronic device includes an outer housing, a rotary member disposed adjacent to, or at least in partial contact with the housing, a first sensor that detects rotation of the rotary member relative to the housing through a first physical change, a second sensor that detects rotation of the rotary member relative to the housing through a second physical change, a battery disposed in the housing, a processor electrically connected to the battery, the first sensor, and the second sensor, and a memory electrically connected to the processor, wherein the memory stores instructions that, when executed, cause the processor to selectively control the operation of at least one of the first and second sensor based on at least one of the state of the electronic device and an application program that is being executed by the processor.

20 Claims, 40 Drawing Sheets

(56) References Cited

U.S. PATENT DOCUMENTS

| | | |
|---|---|---|
| 7,468,603 B2 | 12/2008 | Kang et al. |
| 7,602,268 B2 | 10/2009 | Miyasaka et al. |
| 8,143,981 B2 * | 3/2012 | Washizu et al. |
| 2006/0007129 A1* | 1/2006 | Pletikosa .............. G06F 1/1626 345/156 |
| 2009/0229892 A1* | 9/2009 | Fisher .................. G06F 1/1626 178/18.03 |

* cited by examiner

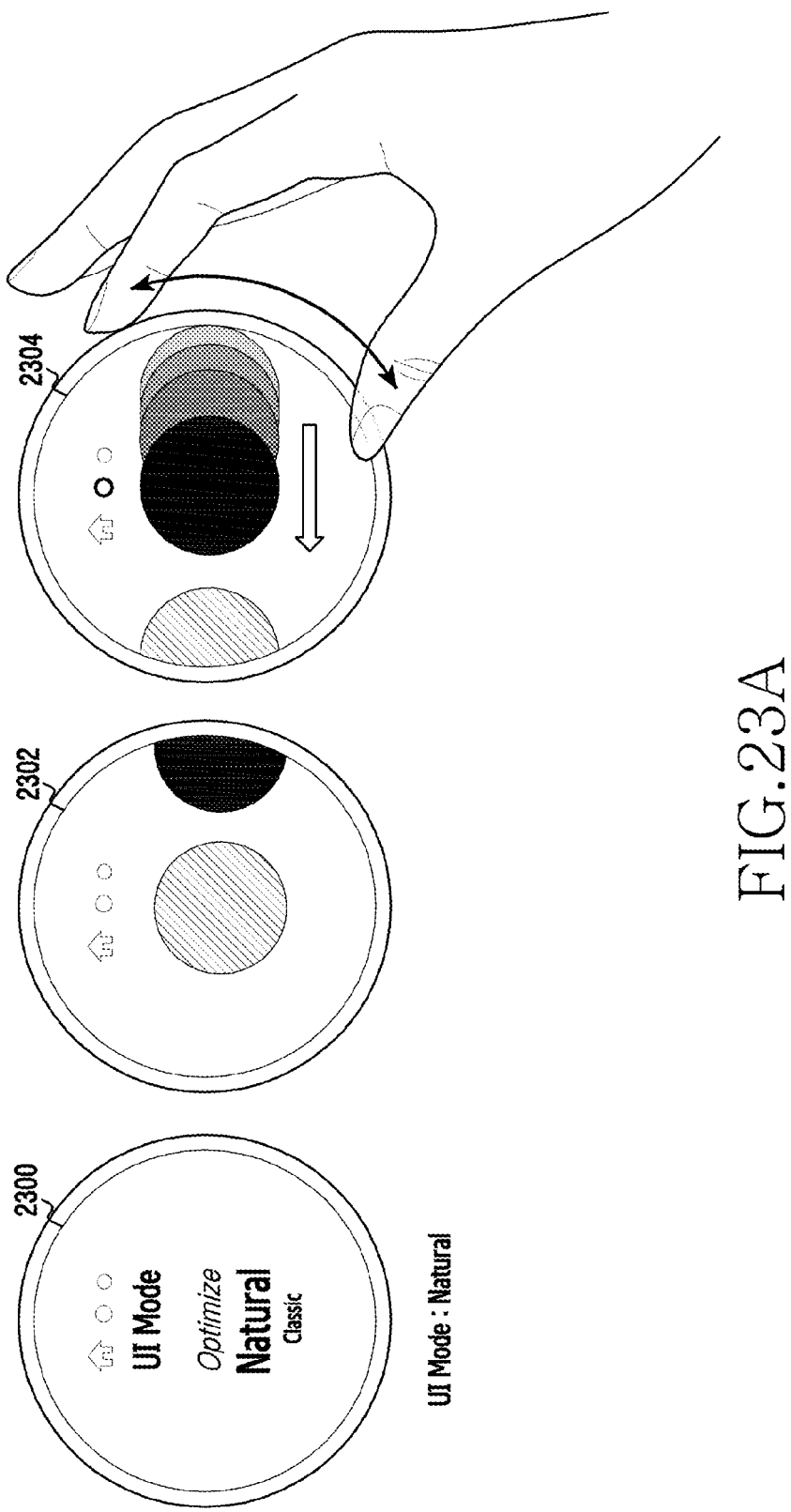

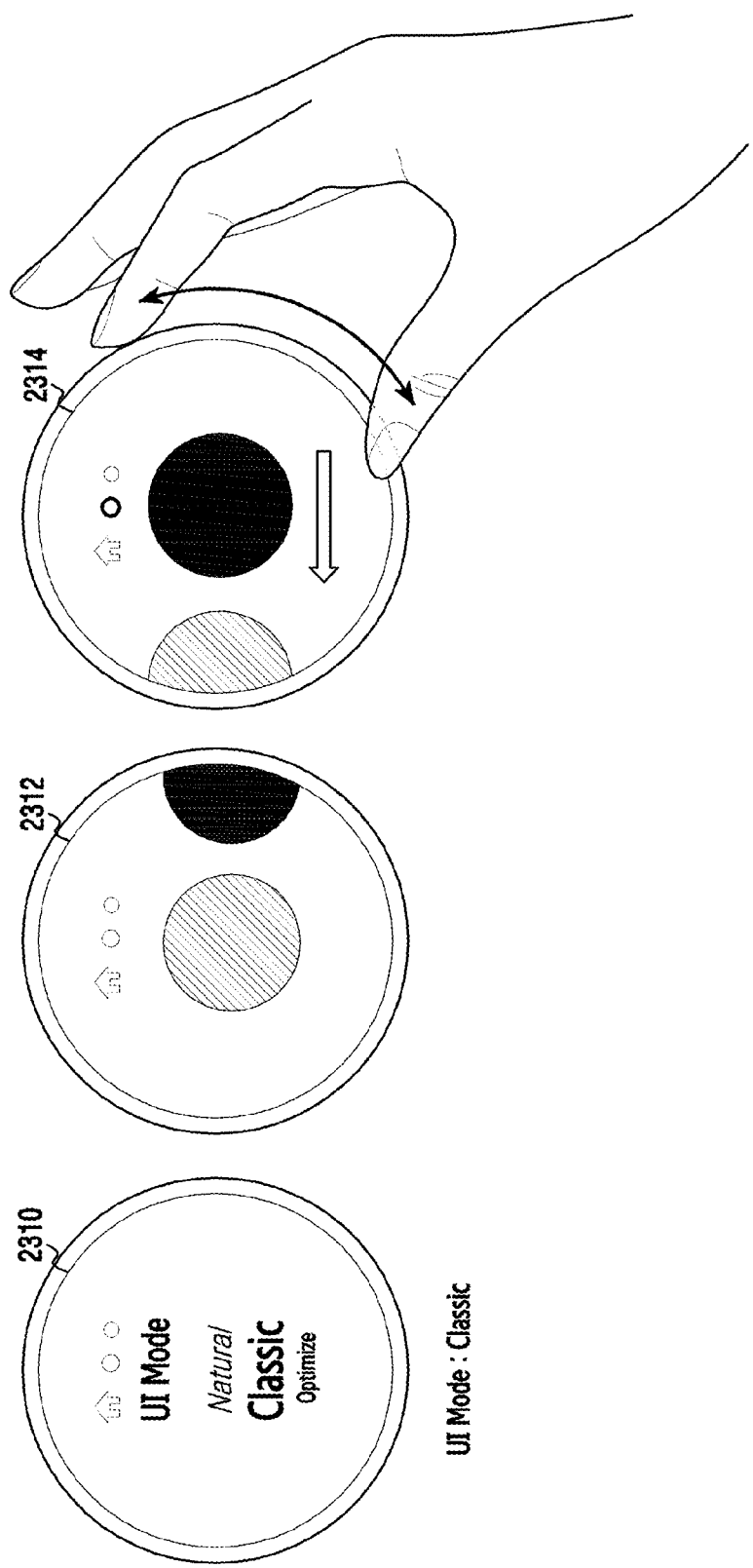

METHOD FOR CONTROLLING ROTATION RECOGNITION UNIT OF ROTATING BODY AND ELECTRONIC DEVICE THEREOF

PRIORITY

This application claims priority under 35 U.S.C. § 119(a) to Korean Patent Application Serial No. 10-2015-0027856, which was filed in the Korean Intellectual Property Office on Feb. 27, 2015, the entire content of which is incorporated herein by reference.

BACKGROUND

1. Field of the Disclosure

The present disclosure generally relates to an electronic device, and more particularly to a method for controlling a rotation recognition unit of a rotating body in an electronic device.

2. Description of the Related Art

Electronic devices have become smaller and slimmer and evolved to be easily carried while performing the same or more diverse functions. Although compact electronic devices are generally carried within users' pockets, they may be worn on the wrist, the head, or the arm of a human body.

Wearable devices that may be worn on human bodies or various structures are formed to be relatively small and slim resulting in limitations in implementing functions thereof. Accordingly, wearable electronic devices may use rotating bodies, such as wheel keys, rotary bezels, etc., as input devices. For example, the electronic devices may recognize the rotation of the rotating bodies using magnets and magnetic sensors. The electronic devices may also recognize the rotation of the rotating bodies by recognizing optical patterns of the rotating bodies using optical sensors that include a light receiving part and a light emitting part. Alternatively, the electronic devices may recognize the rotation of the rotating bodies using mechanical switching devices.

However, in cases where the electronic devices recognize the rotation of the rotating bodies using optical sensors, although the electronic devices may continuously and accurately recognize the rotation according to the extent of image analysis, a large amount of power is consumed due to the complexity and frequent use of the image analysis.

Further, in cases where the electronic devices recognize the rotation of the rotating bodies using magnetic sensors, although a small amount of power is consumed, mounting spaces become narrower due to the plurality of magnets and magnetic sensors, and the electronic devices may fail to continuously recognize the rotation so that usability thereof may deteriorate.

SUMMARY

Various aspects of the present disclosure provide a device and method that reduces power consumption while improving the usability of a rotation recognition unit for recognizing the rotation of a rotating body in an electronic device.

According to an aspect of the present disclosure, an electronic device includes an outer housing, a rotary member disposed adjacent to, or at least in partial contact with the housing, a first sensor that detects the rotation of the rotary member relative to the housing through a first physical change, a second sensor that detects the rotation of the rotary member relative to the housing through a second physical change, a battery disposed in the housing, a processor electrically connected to the battery, the first sensor, and the second sensor, and a memory electrically connected to the processor, wherein the memory stores instructions that when executed, make the processor selectively control the operation of the first and/or second sensor based on at least one of the state of the electronic device and an application program that is being executed by the processor.

According to another aspect of the present disclosure, a method of operating an electronic device includes identifying at least one of the state of the electronic device and an application program that is being executed in the electronic device, wherein the electronic device includes an outer housing, a rotary member disposed adjacent to, at least in partial contact with the housing, a first sensor that detects the rotation of the rotary member relative to the housing through a first physical change, and a second sensor that detects the rotation of the rotary member relative to the housing through a second physical change, and selectively controlling the operation of the first sensor and/or the second sensor based on at least one of the state of the electronic device and the application program.

BRIEF DESCRIPTION OF THE DRAWINGS

The above and other aspects, features, and advantages of the present disclosure will be more apparent from the following detailed description taken in conjunction with the accompanying drawings, in which:

FIGS. 23A and 23B illustrate screen configurations depending on user interface (UI) modes according to various embodiments of the present disclosure;

DETAILED DESCRIPTION

Figure 1:
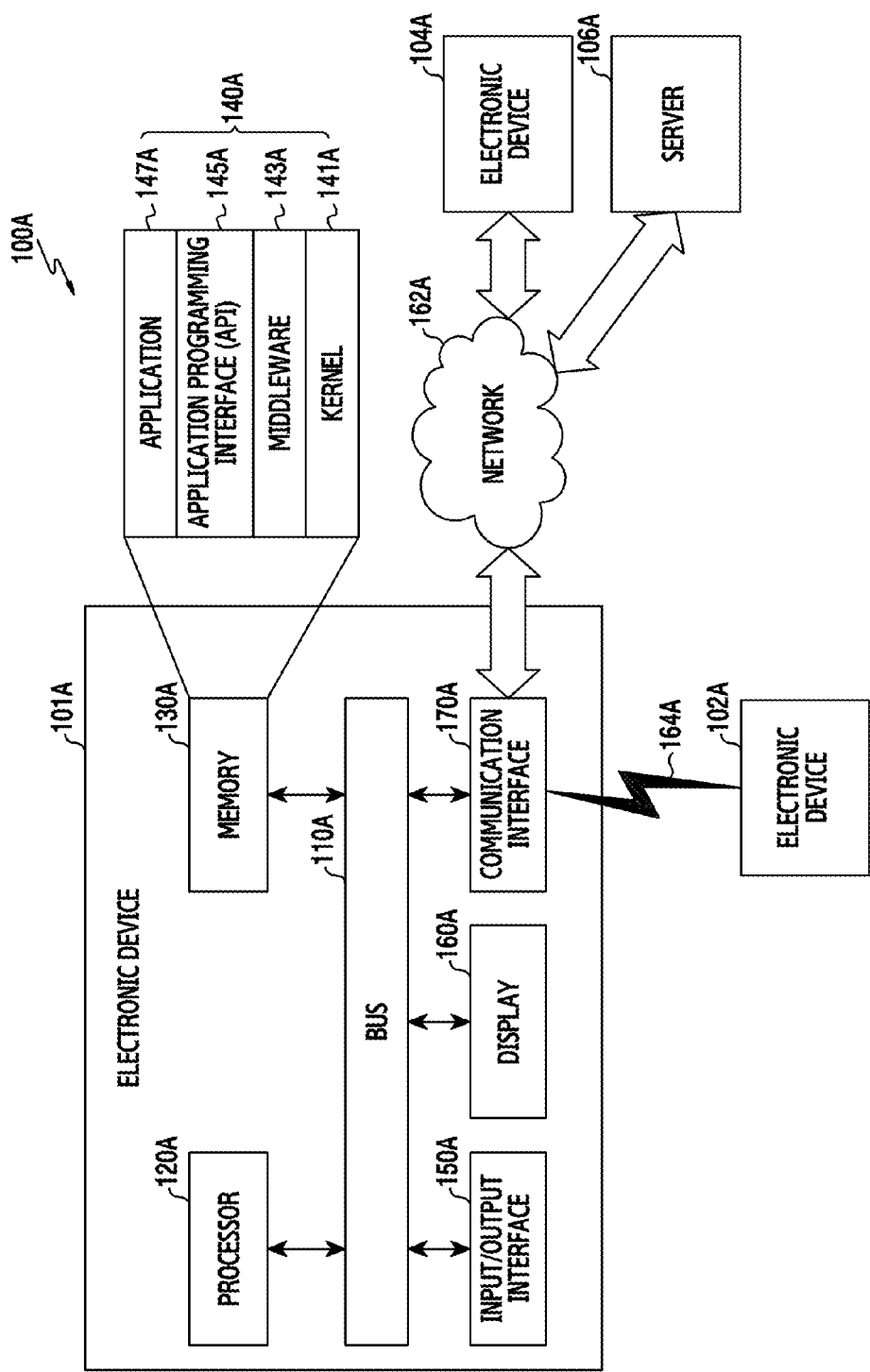
FIG. 1 illustrates an electronic device within a network environment according to various embodiments of the present disclosure.

Hereinafter, various embodiments of the present disclosure will be described in detail with reference to the accompanying drawings. However, it should be understood that the various embodiments of the present disclosure are not limited to specific embodiments and include various modifications, equivalents, and/or alternatives thereof. In describing the drawings, similar reference numerals may be used to designate similar elements.

As used herein, the expressions "have", "may have", "include", or "may include" refer to the existence of a corresponding feature (e.g., numeral, function, operation, or constituent element such as component), and do not exclude one or more additional features.

The expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first", "a second", "the first", or "the second" used in various embodiments of the present disclosure may modify various components regardless of the order and/or the importance but do not limit the corresponding components. The above-described expressions may be used to distinguish an element from another element. For example, a first user device and a second user device indicate different user devices although both are user devices. For example, a first element may be referred to as a second element, and similarly, a second element may be referred to as a first element without departing from the scope of the present disclosure.

It will be understood that when an element (e.g., a first element) is referred to as being "(operatively or communicatively) coupled with/to" or "connected to" another element (e.g., a second element), it may be directly connected to the other element, or it may be connected to the other element through another element (e.g., a third element). In contrast, it is understood that when an element (e.g., a first element) is referred to as being "directly connected to" or "directly coupled to" another element (e.g., a second element), there is no intervening element (e.g., a third element) between the elements.

The expression "configured (or set) to", used in this specification, may be interchangeably used with, for example, "suitable for," "having the capacity to," "designed to," "adapted to," "made to," or "capable of" according to the circumstances. The term "configured (or set) to" may not necessarily mean "specifically designed to" in hardware. Instead, in some cases, the expression "device configured to" may mean that the electronic device together with other electronic devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms and expressions used in the present disclosure are only used to describe specific embodiments, and do not limit the present disclosure. As used herein, singular forms may include plural forms as well, unless the context clearly indicates otherwise. Unless defined otherwise, all terms used herein, including technical terms and scientific terms, may have the same meaning as commonly understood by a person of ordinary skill in the art to which the present disclosure pertains. Terms such as those defined in commonly used dictionaries, should be interpreted as having a meaning that is the same or similar to their meaning in the context of the relevant art and will not be interpreted in an idealized or overly formal sense unless expressly defined herein. In some cases, even the terms defined herein may not be construed to exclude embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., eye-glasses, a head-mounted-device (HMD), electronic clothes, an electronic bracelet, an electronic necklace, an electronic appcessory, an electronic tattoo, a smart mirror, or a smart watch).

According to various embodiments of the present disclosure, the electronic device may be a smart home appliance. The smart home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM), point of sales (POS) terminals, or an Internet of Things device (e.g., a light bulb, various sensors, electric or gas meter, a sprinkler device, a fire alarm, a thermostat, a streetlamp, a toaster, a sporting good, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device may be a flexible device. Further, the electronic device is not limited to the aforementioned devices, and may include a new electronic device according to the development of new technologies.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

An electronic device 101A within a network environment 100A, according to various embodiments of the present disclosure, will be described with reference to FIG. 1. The electronic device 101A includes a bus 110A, a processor 120A (e.g., including processing circuitry), a memory 130A, an input/output interface 150A (e.g., including input/output circuitry), a display 160A (e.g., including a display panel and display circuitry), and a communication interface 170A (e.g., including communication circuitry). In some embodiments of the present disclosure, the electronic device 101A may omit at least one of the elements, or may further include other elements.

The bus 110A may include, for example, a circuit that interconnects the elements 120A to 170A and delivers communication (e.g., a control message and/or data) between the elements.

The processor 120A may include one or more of a Central Processing Unit (CPU), an Application Processor (AP), and a Communication Processor (CP). For example, the processor 120A may carry out operations or data processing relating to the control and/or communication of at least one other element of the electronic device 101A.

The memory 130A may include a volatile memory and/or a non-volatile memory. The memory 130A may store, for example, instructions or data (e.g., pre-stored location information, location information matched to a network, etc.) that is associated with at least one other element of the electronic device 101A. According to an embodiment of the present disclosure, the memory 130A stores software and/or a program 140A. For example, the program includes a kernel 141A, middleware 143A, an Application Programming Interface (API) 145A, application (or "application programs") 147A, etc. At least some of the kernel 141A, the middleware 143A, and the API 145A may be referred to as an Operating System (OS).

The kernel 141A may control or manage, for example, system resources (e.g., the bus 110A, the processor 120A, the memory 130A, etc.) that are used to perform operations or functions implemented in the other programs (e.g., the middleware 143A, the API 145A, or the application 147A). Furthermore, the kernel 141A may provide an interface through which the middleware 143A, the API 145A, or the application 147A may access the individual elements of the electronic device 101A to control or manage the system resources.

For example, the middleware 143A may function as an intermediary for allowing the API 145A or the application 147A to communicate with the kernel 141A to exchange data.

In addition, the middleware 143A may process one or more task requests received from the application 147A according to assigned priorities. For example, the middleware 143A may assign, to one or more of the application 147A, priorities to use the system resources (e.g., the bus 110A, the processor 120A, the memory 130A, etc.) of the electronic device 101A. For example, the middleware 143A may perform scheduling or load balancing on the one or more task requests by processing the one or more task requests according to the priorities assigned to the one or more applications.

The API 145A is an interface through which the application 147A control functions provided from the kernel 141A or the middleware 143A, and may include, for example, at least one interface or function (e.g., instruction) for file control, window control, image processing, text control, etc.

The input/output interface 150A, for example, may function as an interface that forwards instructions or data, which is input from a user or another external device, to other element(s) of the electronic device 101A. Furthermore, the input/output interface 150A may output instructions or data, which are received from the other element(s) of the electronic device 101A, to the user or the other external device.

Examples of the display 160A may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160A, for example, may display various types of content (e.g., text, images, videos, icons, symbols, etc.) for a user. The display 160A may include a touch screen and may receive, for example, a touch, gesture, proximity, or hovering input by using an electronic pen or a part of a user's body.

The communication interface 170A, for example, may control communication between the electronic device 101A and an external device (e.g., a first external electronic device 102A, a second external electronic device 104A, or a server 106A). For example, the communication interface 170A may be connected to a network 162A through wireless or wired communication to communicate with the external device 104A or the server 106A.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), etc., as a cellular communication protocol. In addition, the wireless communication may include, for example, short range communication 164A. The short range communication 164A may include at least one of, for example, Wi-Fi, Bluetooth, Near Field Communication (NFC), Global Navigation Satellite System (GNSS), etc. The GNSS may include at least one of, for example, a Global Positioning System (GPS), a Global navigation satellite system (Glonass), a Beidou navigation satellite system (Beidou), and Galileo (European global satellite-based navigation system) according to the place of usage, a bandwidth requirement, etc. Hereinafter, in the present disclosure, "GPS" may be interchangeably used with "GNSS". The wired communication may include at least one of, for example, a Universal Serial Bus (USB), a High Definition Multimedia Interface (HDMI), Recommended Standard 232 (RS-232), a Plain Old Telephone Service (POTS), etc. The network 162A may include a telecommunication network, for example, at least one of a computer network (e.g., a LAN or a WAN), the Internet, and a telephone network.

Each of the first and second external electronic devices 102A and 104A may be the same as, or a different type than the electronic device 101A. According to an embodiment of the present disclosure, the server 106A may include a group of one or more servers. All or some of the operations performed in the electronic device 101A may be performed in another electronic device or a plurality of electronic devices 102A, 104A or the server 106A. When the electronic device 101A has to perform a function or service automatically or in response to a request, the electronic device 101A may request at least some functions relating to the function or service from another device 102A, 104A or the server 106A additionally or instead of performing the function or service by itself. The other electronic device 102A, 104A or the server 106A may execute the requested function or the additional function and may deliver the result to the electronic device 101A. The electronic device 101A may process the received result as it is, or additionally, to provide the requested function or service. To this end, for example, cloud computing, distributed computing, or client-server computing technology may be used.

Figure 2:
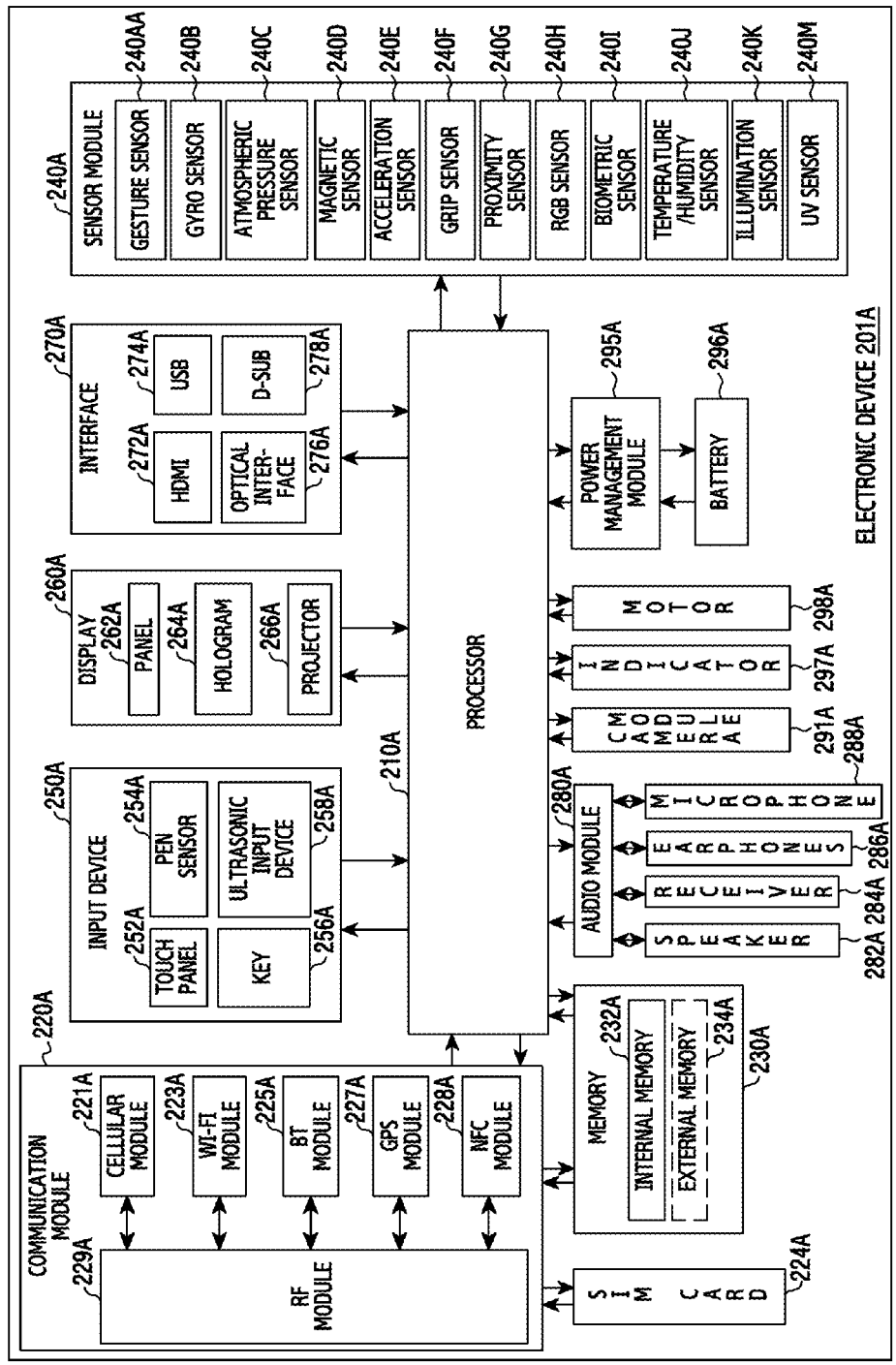
FIG. 2 is a block diagram of an electronic device according to various embodiments of the present disclosure.

FIG. 2 is a block diagram of an electronic device 201A according to various embodiments of the present disclosure. The electronic device 201A may include, for example, the entire, or a part, of the electronic device 101A illustrated in FIG. 1. The electronic device 201A includes at least one processor (e.g., an Application Processor (AP)) 210A, a communication module 220A, a subscriber identification module 224A, a memory 230A, a sensor module 240A, an input device 250A, a display 260A, an interface 270A, an audio module 280A, a camera module 291A, a power management module 295A, a battery 296A, an indicator 297A, and a motor 298A.

The processor 210A may drive, for example, an operating system or application programs to control a plurality of hardware or software elements connected thereto and to perform various types of data processing and operations. The processor 210A may be implemented by, for example, a System on Chip (SoC). According to an embodiment of the present disclosure, the processor 210A may further include a graphic processing unit (GPU) and/or an image signal processor. The processor 210A may also include at least a part (e.g., a cellular module 221A) of the elements illustrated in FIG. 2. The processor 210A may load, into a volatile memory, instructions or data received from at least one of the other elements (e.g., a non-volatile memory), process the loaded instructions or data, and store various data in a non-volatile memory.

The communication module 220A may have the same, or a similar, configuration as the communication interface 170A of FIG. 1. The communication module 220A includes a cellular module 221A, a WiFi module 223A, a Bluetooth module 225A, a GPS module 227A (e.g., a GNSS module, a Glonass module, a Beidou module, or a Galileo module), an NFC module 228A, and a Radio Frequency (RF) module 229A.

The cellular module 221A may provide, for example, a voice call, a video call, a text message service, an Internet access service, etc. through a communication network. According to an embodiment of the present disclosure, the cellular module 221A may distinguish and authenticate the electronic device 201A within a communication network by using a subscriber identification module (e.g., a SIM card)

224A. The cellular module 221A may perform at least some of the functions that the processor 210A may provide. The cellular module 221A may include a Communication Processor (CP).

The WiFi module 223A, the Bluetooth module 225A, the GPS module 227A, or the NFC module 228A may include, for example, a processor for processing data that is transmitted and received through the corresponding module. At least some (e.g., two or more) of the cellular module 221A, the WiFi module 223A, the Bluetooth module 225A, the GPS module 227A, and the NFC module 228A may be included in a single Integrated Chip (IC) or IC package.

The RF module 229A may transmit/receive, for example, a communication signal (e.g., an RF signal). The RF module 229A may include, for example, a transceiver, a Power Amp Module (PAM), a frequency filter, a Low Noise Amplifier (LNA), an antenna, etc. At least one of the cellular module 221A, the WiFi module 223A, the Bluetooth module 225A, the GPS module 227A, and the NFC module 228A may transmit and receive an RF signal through a separate RF module.

The SIM 224A may include a card that includes an embedded SIM, and may contain unique identification information (e.g., an Integrated Circuit Card Identifier (ICCID)) or subscriber information (e.g., an International Mobile Subscriber Identity (IMSI)).

The memory 230A (e.g., the memory 130A) includes an internal memory 232A and/or an external memory 234A. The internal memory 232A may include at least one of, for example, a volatile memory (e.g., a Dynamic Random Access Memory (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disc drive, or a Solid State Drive (SSD)).

The external memory 234A may include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, etc. The external memory 234A may be functionally and/or physically connected to the electronic device 201A through various interfaces.

The sensor module 240A, for example, may measure a physical quantity or detect an operating state of the electronic device 201A and may convert the measured or detected information into an electrical signal. The sensor module 240A includes least one of, for example, a gesture sensor 240AA, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric sensor 240I, a temperature/humidity sensor 240J, an illumination sensor 240K, and an ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240A may further include a control circuit for controlling one or more sensors included therein. The electronic device 201A may further include a processor configured to control the sensor module 240A as a part of, or separately from, the processor 210A, and may control the sensor module 240A while the processor 210A is in a sleep state.

The input device 250A may include, for example, a touch panel 252A, a (digital) pen sensor 254A, a key 256A, or an ultrasonic input device 258A. The touch panel 252A may use at least one of, for example, a capacitive type, a resistive type, an infrared type, and an ultrasonic type. Furthermore, the touch panel 252A may also include a control circuit. The touch panel 252A may further include a tactile layer to provide a tactile reaction to a user.

The (digital) pen sensor 254A may include, for example, a recognition sheet that is a part of the touch panel or is separate from the touch panel. The key 256A may include, for example, a physical button, an optical key, or a keypad. The ultrasonic input device 258A may detect ultrasonic waves, which are generated by an input tool, through a microphone 288A, and may identify data corresponding to the detected ultrasonic waves.

The display 260A (e.g., the display 160A) may include a panel 262A, a hologram device 264A, or a projector 266A. The panel 262A may include the same or a similar configuration to the display 160A illustrated in FIG. 1. The panel 262A may be flexible, transparent, or wearable. The panel 262A, together with the touch panel 252A, may be implemented as a single module. The hologram device 264A may show a three dimensional image in the air by using interference of light. The projector 266A may display an image by projecting light onto a screen. The screen may be located, for example, in the interior of, or on the exterior of, the electronic device 201A. According to an embodiment of the present disclosure, the display 260A may further include a control circuit for controlling the panel 262A, the hologram device 264A, or the projector 266A.

The interface 270A may include, for example, a High-Definition Multimedia Interface (HDMI) 272A, a Universal Serial Bus (USB) 274A, an optical interface 276A, or a D-subminiature (D-sub) 278A. The interface 270A may be included in, for example, the communication interface 170A illustrated in FIG. 1. Additionally or alternatively, the interface 270A may include, for example, a Mobile High-definition Link (MHL) interface, a Secure Digital (SD) card/Multi-Media Card (MMC) interface, or an Infrared Data Association (IrDA) standard interface.

The audio module 280A, may convert a sound into an electrical signal, and vice versa. At least some elements of the audio module 280A may be included in, for example, the input/output interface 150A illustrated in FIG. 1. The audio module 280A may process sound information that is input or output through, for example, a speaker 282A, a receiver 284A, earphones 286A, the microphone 288A, etc.

The camera module 291A is a device that may photograph a still image and a moving image. The camera module 291A may include one or more image sensors (e.g., a front sensor or a back sensor), a lens, an Image Signal Processor (ISP), or a flash (e.g., an LED, a xenon lamp, etc.).

The power management module 295A may manage, for example, the power of the electronic device 201A. The power management module 295A may include a Power Management Integrated Circuit (PMIC), a charger IC, or a battery gauge. The battery gauge may be used to determine the battery residual quantity. The battery residual quantity is a measure of the remaining energy capacity of a battery. The PMIC may use a wired and/or wireless charging method. Examples of the wireless charging method may include, for example, a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, the remaining charge of the battery 296A, and a voltage, a current, or a temperature while charging. The battery 296A may include, for example, a rechargeable battery and/or a solar battery.

The indicator 297A may indicate a particular state (e.g., a booting state, a message state, a charging state, etc.) of the electronic device 201A or a part thereof (e.g., the processor 210A). The motor 298A may convert an electrical signal into a mechanical vibration and may generate a vibration, a haptic effect, etc. The electronic device 201A may include a processing unit (e.g., a GPU) for supporting mobile TV. The processing unit for supporting mobile TV may process media data according to a standard, for example, Digital Multimedia Broadcasting (DMB), Digital Video Broadcasting (DVB), MediaFLO™, etc.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the components according to various embodiments may be combined into one entity, which may perform functions identical to those of the relevant components before the combination.

Figure 3:
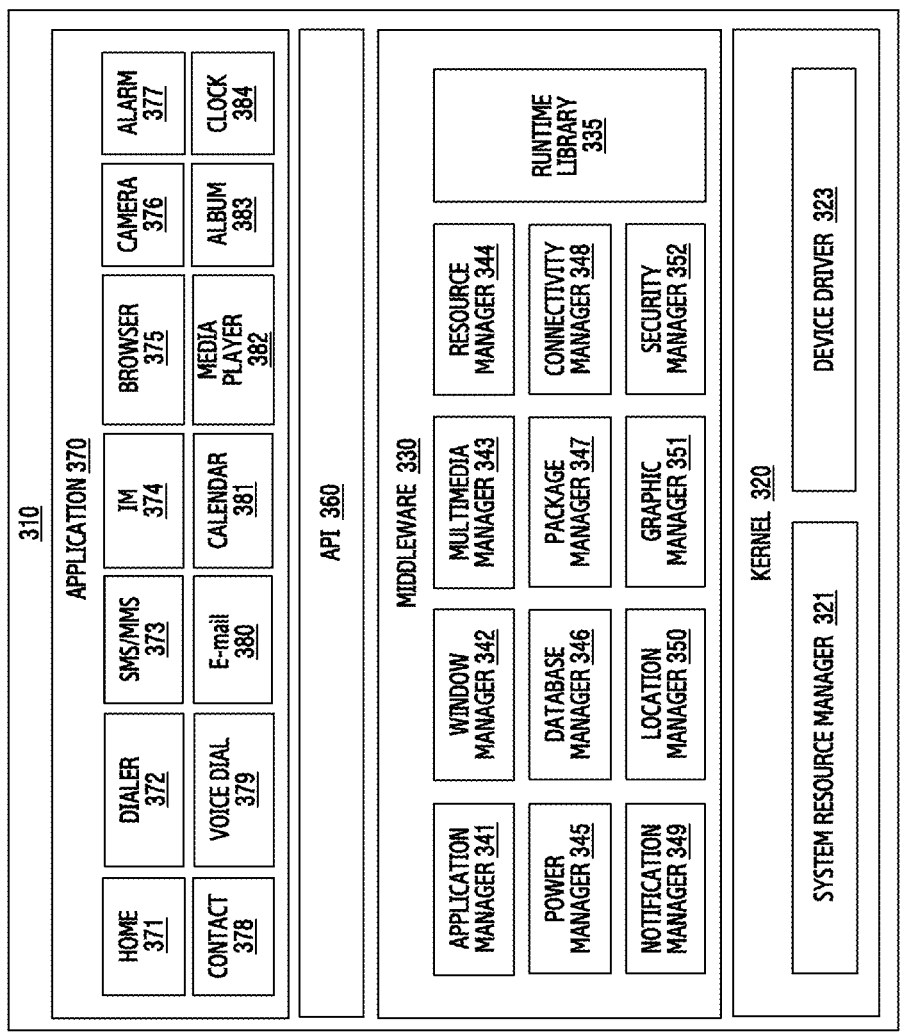
FIG. 3 is a block diagram of a program module according to various embodiments of the present disclosure.

FIG. 3 is a block diagram of a program module according to various embodiments of the present disclosure. The program module 310 (e.g., the program 140A) may include an Operating System (OS) that controls resources relating to an electronic device (e.g., the electronic device 101A) and/or various applications (e.g., the application 147A) that are driven on the operating system. The operating system may be, for example, Android™, iOS™, Windows™, Symbian™, Tizen™, Bada™, etc.

The program module 310 includes a kernel 320, middleware 330, an Application Programming Interface (API) 360, and/or applications 370. At least a part of the program module 310 may be preloaded on the electronic device, or may be downloaded from an external electronic device 102A, 104A, the server 106A, etc.

The kernel 320 (e.g., the kernel 141A) includes a system resource manager 321 and/or a device driver 323. The system resource manager 321 may control, assign, or retrieve system resources. The system resource manager 321 may include a process management unit, a memory management unit, a file system management unit, etc. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide a function required by the applications 370 in common, or may provide various functions to the applications 370 through the API 360 so that the applications 370 may efficiently use the limited system resources of the electronic device. According to an embodiment of the present disclosure, the middleware 330 (e.g., the middleware 143A) includes at least one of, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform functions that are related to the management of input and output, the management of memory, an arithmetic function, etc.

The application manager 341 may manage, for example, a life cycle of at least one of the applications 370. The window manager 342 may manage UI resources that are used on a screen. The multimedia manager 343 may identify formats required for reproducing various media files and may encode or decode a media file using a codec suitable for the corresponding format. The resource manager 344 may manage resources of at least one of the applications 370, such as a source code, a memory, a storage space, etc.

The power manager 345 may operate together with, for example, a Basic Input/Output System (BIOS) to manage a battery or power, and may provide power information required for operating the electronic device 101A. The database manager 346 may generate, search, or change a database to be used by at least one of the applications 370. The package manager 347 may manage the installation or the updating of an application that is distributed in the form of a package file.

The connectivity manager 348 may manage a wireless connection, for example, Wi-Fi, Bluetooth, etc. The notification manager 349 may display or notify of an event, such as an arrival message, an appointment, notification of proximity, etc., in such a manner as not to disturb a user. The location manager 350 may manage the location information of the electronic device 101A. The graphic manager 351 may manage a graphic effect to be provided to a user and a user interface relating to the graphic effect. The security manager 352 may provide all security functions required for system security or user authentication. According to an embodiment of the present disclosure, in cases where the electronic device 101A has a telephone call function, the middleware 330 may further include a telephony manager for managing a voice or video call function of the electronic device.

The middleware 330 may include a middleware module that forms combinations of the various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145A) is, for example, a set of API programming functions, and may be provided with different configurations according to the operating systems. For example, in the case of Android or iOS, one API set may be provided for each platform, and in the case of Tizen, two or more API sets may be provided for each platform.

The applications 370 includes one or more applications that may perform functions, such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), providing environment information (e.g., providing atmospheric pressure, humidity, temperature information, etc,).

According to an embodiment of the present disclosure, the applications 370 may include an application (hereinafter, referred to as an "information exchange application") that supports information exchange between the electronic device 101A and an external electronic device 102A or 104A. The information exchange application may include, for example, a notification relay application for forwarding particular information to an external electronic device or a device management application for managing an external electronic device.

For example, the notification relay application may include a function of forwarding, to an external electronic device 102A or 104A, notification information that is generated by the other applications of the electronic device (e.g., the SMS/MMS application, the e-mail application, the health care application, the environmental information application, etc.). Furthermore, the notification relay application, for example, may receive notification information from an external electronic device and may provide the received notification information to a user.

The device management application may manage (e.g., install, remove, or update) at least one function of an external electronic device 102A or 104A that communicates with the electronic device (a function of turning on/off the external electronic device itself (or some components thereof) or a function of adjusting the brightness (or resolution) of a display), an application that operates in the external electronic device or a service provided by the external electronic device (e.g., a telephone call service, a message service, etc.).

According to an embodiment of the present disclosure, the applications 370 may include an application (e.g., a health care application of a mobile medical appliance, etc.) that is designated according to the attribute of an external electronic device 102A or 104A. The applications 370 may include an application that is received from an external electronic device 102A, 104A or server 106A. The applications 370 may include a preloaded application or a third party application that may be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more of them. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4A:
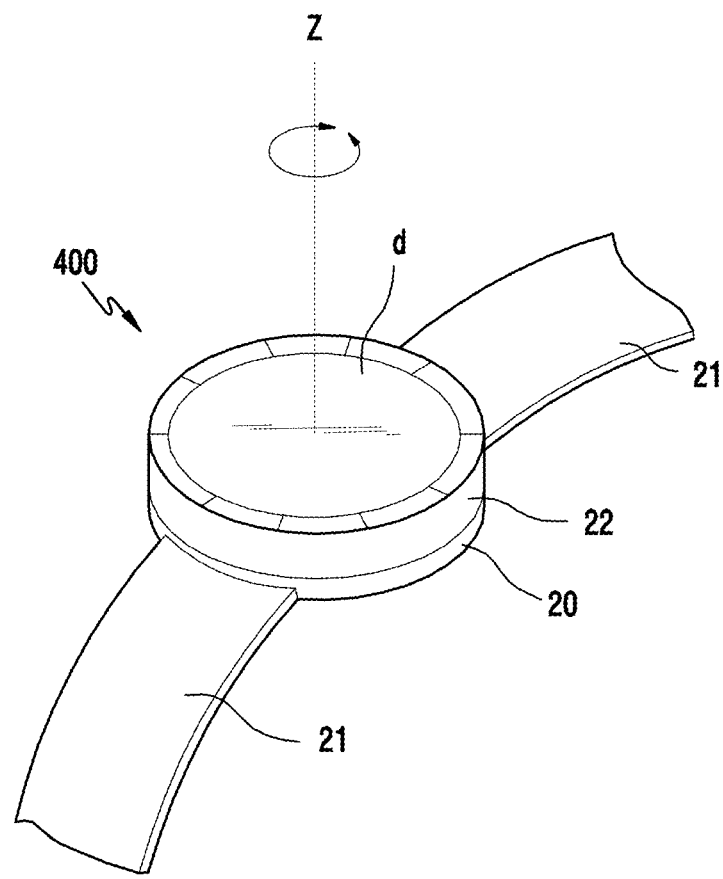
FIG. 4A is a perspective view of an electronic device according to various embodiments of the present disclosure.

FIG. 4A is a perspective view of an electronic device according to various embodiments of the present disclosure.

Referring to FIG. 4A, the electronic device 400 is a wrist-mounted wearable electronic device that may be worn on a user's wrist.

The electronic device 400 includes a main body 20 and a connection part 21 (e.g., a strap) that is equipped to the main body 20. For example, the electronic device 400 may be worn in such a manner that the connecting part 21 is wound around the wrist while the main body 20 is placed on the wrist. The connecting part 21 may have a plurality of openings formed therein at a predetermined interval for adjusting the wearing position in accordance with the user's wrist.

The main body 20 may include a display (d). A touch screen type of display (d) may be employed. At least one key button may be disposed in a suitable position on the main body 20.

The electronic device 400 may have a battery (e.g., a rechargeable battery, etc.) therein as a power supply means.

The electronic device 400 may be selectively mounted on a portable charging cradle in order to charge the battery.

The electronic device 400 may include a rotating body 22 that is rotatably mounted on the main body 20. For example, the rotating body 22 may be installed to surround the whole display (d) disposed on the main body 20. For example, in cases where the electronic device 400 is a wrist-mounted wearable electronic device, the rotating body 22 may be disposed in a rotary bezel type.

The rotating body 22 may rotate about the Z-axis in the clockwise or counterclockwise direction, and may be configured to rotate up to 360 degrees or to rotate freely without any limitation.

The electronic device 400 may perform various functions according to a rotation parameter of the rotating body 22. For example, the electronic device 400 may perform various functions according to the rotation parameter of the rotating body 22 that is detected by using a plurality of rotation recognition units. For example, the plurality of rotation recognition units may include an optical sensor that detects the rotation parameter of the rotating body 22 by recognizing an optical pattern of the rotating body and a magnetic force detection sensor that detects the rotation parameter of the rotating body 22 by sensing the magnetic force of a magnet that is mounted in the rotating body 22. The rotation parameter may include at least one of the direction, speed, and amount of rotation of the rotating body and the rotated position thereof.

Figure 4B:
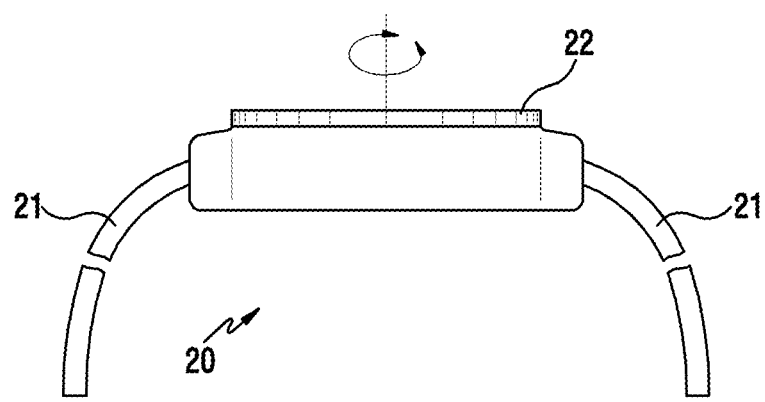
FIG. 4B is a side view of an electronic device according to various embodiments of the present disclosure.

FIG. 4B is a side view of the electronic device according to the various embodiments of the present disclosure.

Referring to FIG. 4B, the electronic device 400 is a wearable device that may be worn on a user's wrist. The electronic device includes the main body 20 and the connecting part 21 (e.g., a strap or a band) that is equipped to the main body 20. The connecting part 21 may have a plurality of openings formed therein at a predetermined interval for adjusting the wearing position in accordance with the user's wrist. The connecting part 21 may be formed of at least one of metal, leather, rubber, silicone, and urethane. The connecting part 21 may be worn on a particular position of a human body, for example, the neck, the ankle, the wrist, etc. The main body 20 may have a substantially cylindrical shape, and the rotating body 22 that may control various UI environments may be disposed on the upper surface of the main body 20. The user may rotate the rotating body 22 to provide various UI environments.

Figure 5:
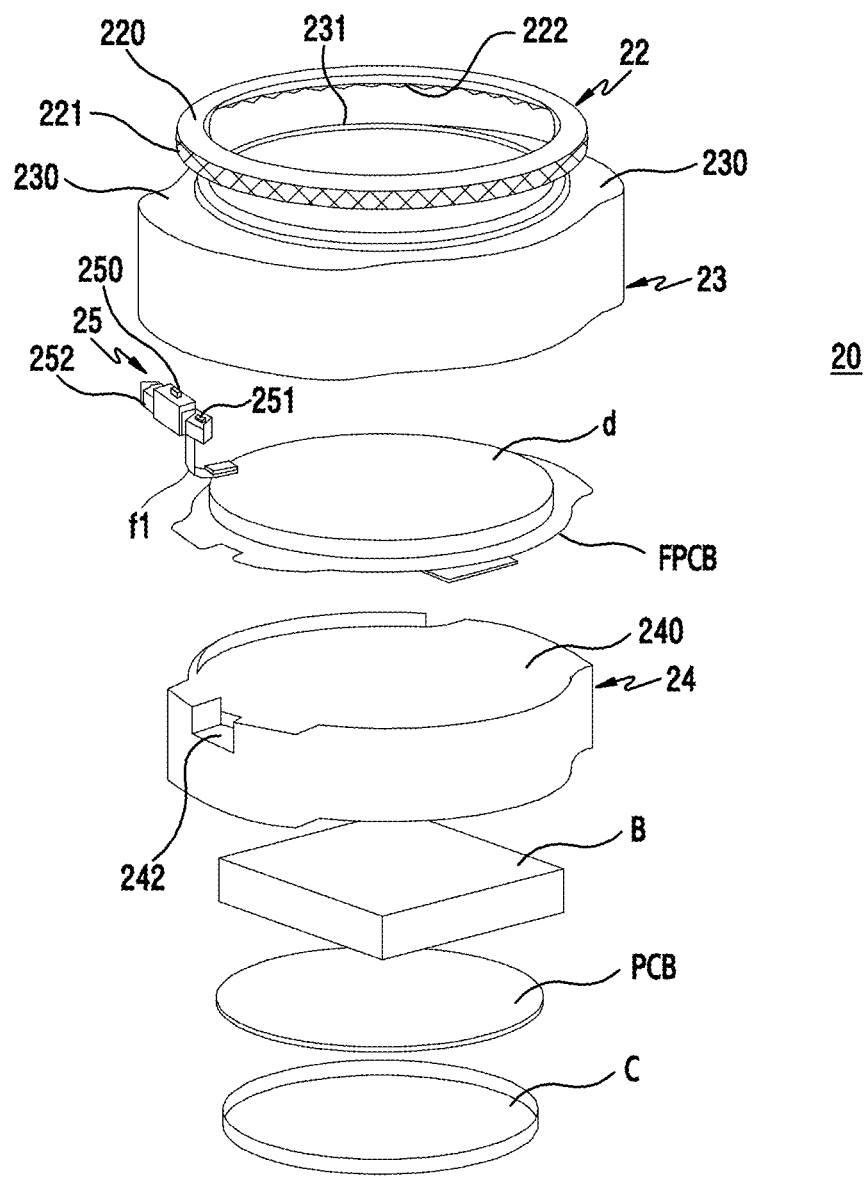
FIG. 5 is an exploded perspective view of an electronic device according to various embodiments of the present disclosure.

FIG. 5 is an exploded perspective view of the electronic device according to the various embodiments of the present disclosure. In FIG. 5, only the main body of the electronic device is illustrated, omitting the strap.

Referring to FIG. 5, the electronic device includes the display (d). A touch screen type of display (d) may be employed. The display (d) may include a flat display module or a curved display module. The display (d) may be disposed in an opening that is in the center of a first support structure, which will be described below.

The electronic device, may have a battery B (e.g., a rechargeable battery, etc.) therein as a power supply means. The battery B (e.g., power supply means) may be mounted on a circuit component mounting part printed circuit board (PCB). For example, the circuit component mounting part PCB may include a printed circuit board that is formed of a hard material.

The electronic device, may include the rotating body 22 that is rotatably mounted on the main body 20. The rotating body 22 may rotate to perform various input operations. The rotating body 22 may have a substantially annular shape and may be disposed to surround the outer periphery of the display (d). The rotating body 22 may also be referred to as a rotary bezel.

In cases where the electronic device is a wrist-mounted wearable electronic device, a rotary bezel type of rotating body 22 may be disposed thereon. The rotating body 22 may rotate about the vertical axis in the clockwise or counterclockwise direction, and may be configured to rotate up to 360 degrees or to rotate freely without any limitation.

The electronic device, may have various sensors disposed therein. The electronic device may include a sensor unit 25 that may detect the rotational position, the rotational direction, etc. of the rotating body 22. The function of the sensor unit 25, according to the rotation of the rotating body 22, may be automatically displayed on the display (d). The electronic device may recognize the rotation parameter of the rotating body 22 (e.g., the direction, speed, or amount of rotation of the rotating body 22, the rotated position thereof, etc.). The sensor unit 25 may include a plurality of sensors 250, 251, and 252. The sensor unit 25 may include the optical sensor 250 and one or more magnetic force detection units (magnetic force detection sensors), for example, the magnetic sensors 251 and 252.

The electronic device, may include the rotating body 22 and support structures 23 and 24. The rotating body 22 may be rotatably mounted on the support structure 23, and the electronic device may be operated by the rotation of the rotating body 22. The rotating body 22, as an input device, may be set in various modes according to the amount or direction of rotation thereof.

The rotating body 22 is rotatably mounted on the first support structure 23 to make the operation of the electronic device possible. The rotating body 22 having an annular shape may include a first surface 220, a second surface 222 opposite to the first surface 220, and an outer peripheral surface 221.

The support structures 23 and 24 may be formed of an injection material, an alloy, or a combination thereof and may protect or support all components employed in the electronic device. The support structures 23 and 24 may include the first support structure 23 (the first fixed part) and the second support structure 24 (the second fixed part). The support structures 23 and 24 may also be referred to as coupling structures or fixed objects (fixed parts). The first support structure 23 may be referred to as an external structure because the first support structure is located on the outside, and the second support structure 24 may be referred to as an internal structure because the second support structure is located on the inside.

The first and second support structures 23 and 24 may be coupled to each other to support components that are mounted in the electronic device. The first and second support structures 23 and 24 may be coupled to each other in the vertical direction. The first and second support structures 23 and 24 may be injection-molded structures that may support electronic components. Furthermore, the first and second support structures 23 and 24 may be coupled in the shape of a cylinder, a rectangular parallelepiped, etc.

The first support structure 23 may have a substantially hollow shape and may include a central region (central portion) 231 and an outer circumferential region (outer peripheral portion) 230 around the central region. The central region 231, which is an open space, may be a mounting space in which the second support structure 24 is accommodated. The central region 231 may be a space in which the display (d) and the second support structure 24 are accommodated and arranged, wherein the display (d) is disposed on the upper surface of the second support structure 24. The outer circumferential region 230, which surrounds the central region 231, may be a region in which the rotating body 22 is disposed, and may be a surface that faces the bottom surface 222 of the rotating body 22.

The second support structure 24 may be closed at the upper end thereof and open at the lower end thereof, and the battery B and the circuit component mounting part PCB may be accommodated in the internal space of the second support structure 24. The battery B may be mounted on the circuit component mounting part PCB. The circuit component mounting part PCB may include a central processing unit, a wireless communication unit, a sensing unit, and an electrical connection unit.

Furthermore, the second support structure 24 is a housing that is coupled to the first support structure 23 in the vertical direction, and a lower cover C may be coupled to the lower end of the second support structure 24. In addition, the second support structure 24 may have a recess 242 formed therein in which the sensor unit 25 is disposed. The recess 242 may be formed in the outer peripheral region of the second support structure 24, and the optical sensor 250 and the magnetic sensors 251 and 252 may be positioned in the recess 242. The optical sensor 250 and the magnetic sensors 251 and 252 may be mounted on an electrical connection part (for example a flexible printed circuit board f1), and may be electrically connected to the circuit component mounting part PCB through the flexible printed circuit board f1.

Figure 6:
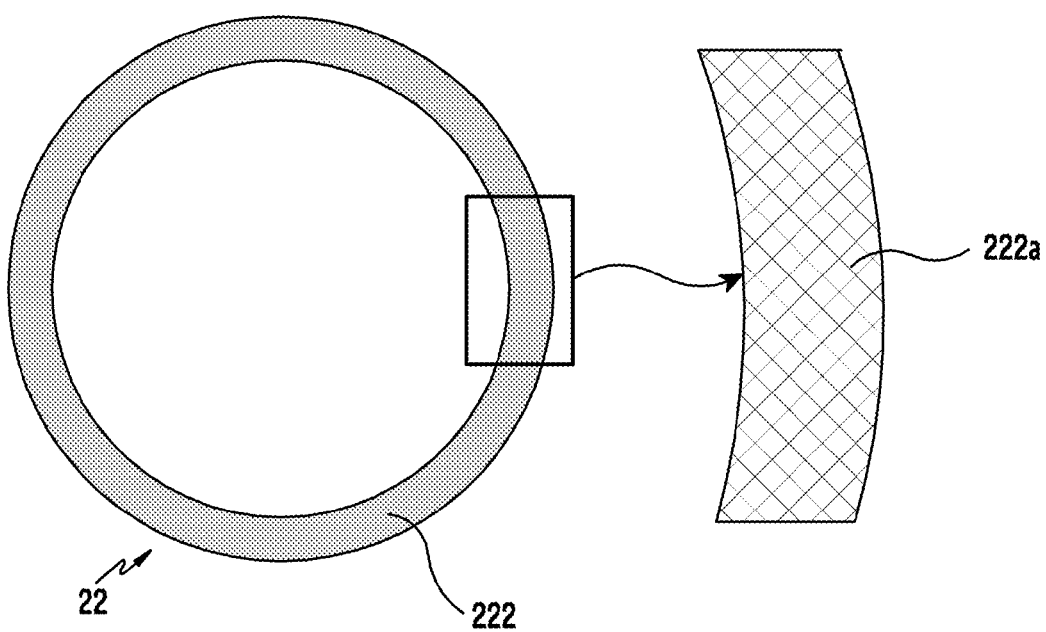
FIG. 6 illustrates an optical pattern formed on the bottom surface of a rotating body according to various embodiments of the present disclosure.

FIG. 6 illustrates an optical pattern formed on the bottom surface of the rotating body, according to various embodiments of the present disclosure.

Referring to FIG. 6, the rotating body 22 has the optical pattern 222*a* imprinted on the bottom surface 222 thereof. The optical pattern 222*a* may be imprinted on the whole bottom surface 222 in a uniform pattern. The optical pattern 222*a* may be imprinted using a laser. Although described below, the amount or direction of rotation of the rotating body 22 may be detected by the optical pattern 222*a*.

Figure 7A:
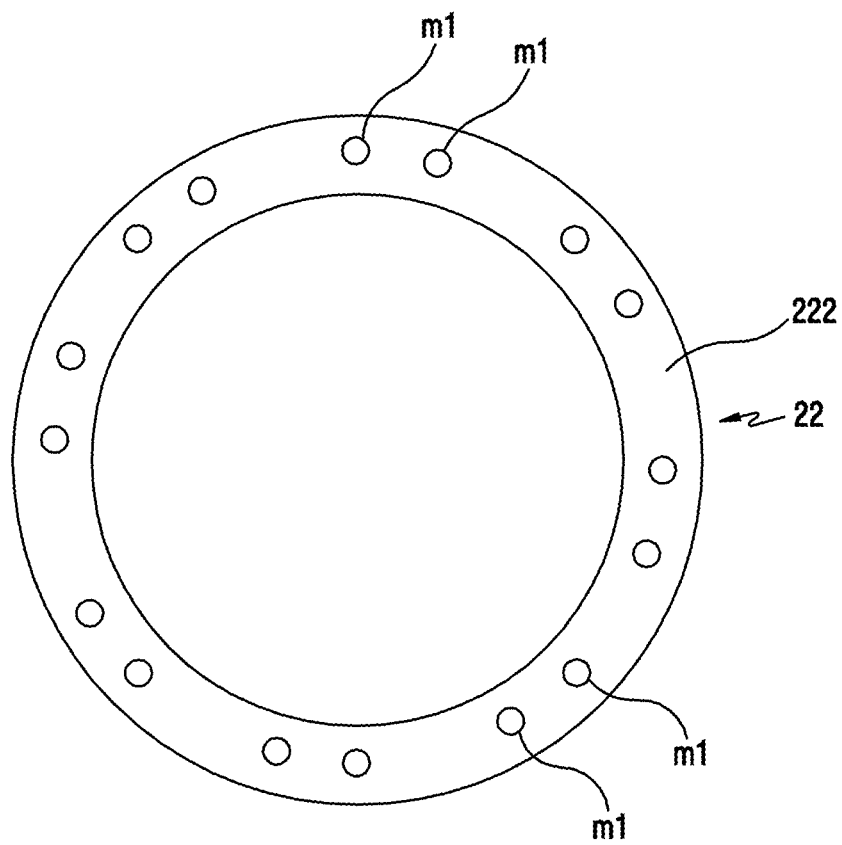
FIG. 7A illustrates the arrangement of a plurality of first magnetic materials equipped to the rotating body, according to various embodiments of the present disclosure.
Figure 7B:
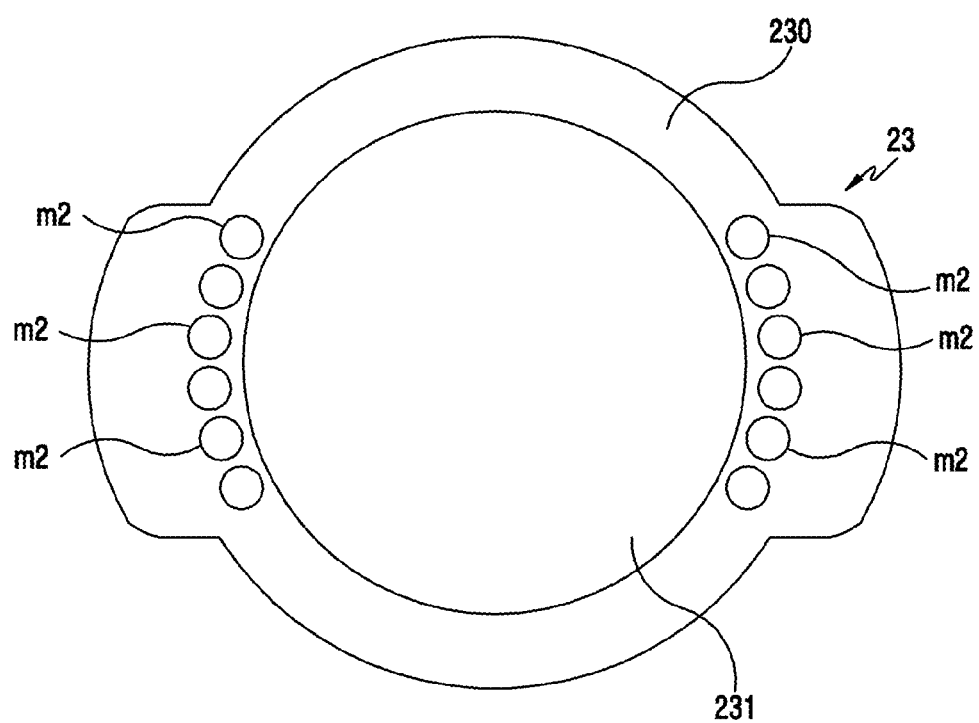
FIG. 7B illustrates the arrangement of a plurality of second magnetic materials that are provided in the outer peripheral region of a first support structure, according to various embodiments of the present disclosure.
Figure 8:
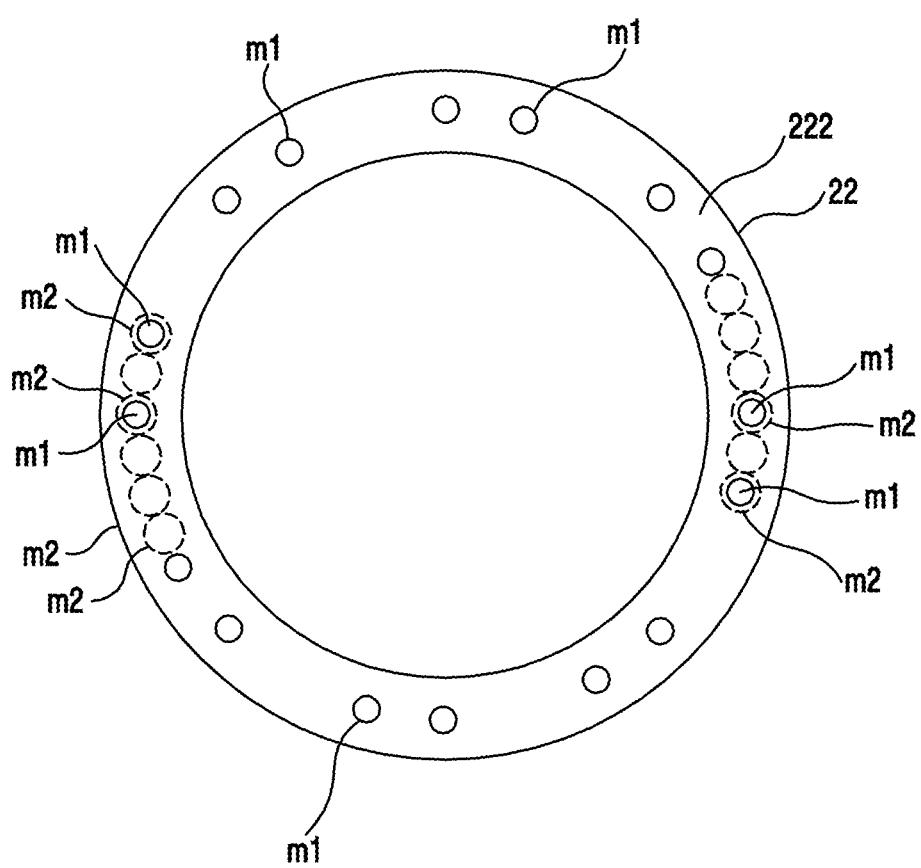
FIG. 8 illustrates the arrangement of the first and second magnetic materials when the rotating body is superposed on the outer peripheral region of the first support structure, according to various embodiments of the present disclosure.

FIG. 7A illustrates the arrangement of a plurality of first magnetic materials equipped to the rotating body, according to various embodiments of the present disclosure. FIG. 7B illustrates the arrangement of a plurality of second magnetic materials that are provided in the outer peripheral region of the first support structure. FIG. 8 illustrates the arrangement of the first and second magnetic materials when the rotating body is superposed on the outer peripheral region of the first support structure.

Referring to FIGS. 7A, 7B, and 8, the first magnetic materials m1 and the second magnetic materials m2 may be mounted on a portion of the rotating body 22 and a portion of the first support structure 23, respectively, which face each other. The rotating body 22 may be mounted on the outer peripheral region 230 of the first support structure 23 to rotate in the clockwise or counterclockwise direction. While the rotating body 22 is rotating, a click-feeling to the rotation of the rotating body 22 may be generated by the operation of the first and second magnetic materials m1 and m2. In general, a repulsive force may act between magnetic materials that have the same polarity, and an attractive force may act between magnetic materials that have opposite polarities. By using the property of magnetic materials, the rotating body 22 may have a click-feeling during the rotation.

Referring to FIG. 7A, the rotating body 22 may have the first surface and the second surface 222 opposite to the first surface. The first surface may face an upper cover made of a ceramic material, which will be described below, and the second surface 222 may face the outer peripheral region of the first support structure. The rotating body 22 may be provided with the plurality of first magnetic materials m1. Particularly, the first magnetic materials m1 may be accommodated individually or in pairs in the rotating body 22 so as to be spaced apart from each other along the circumferential direction of the rotating body 22. The first magnetic materials m1 may be, for example, permanent magnets that have North and South poles. The first magnetic materials may be arranged at various intervals.

Referring to FIG. 7B, the first support structure may be provided with the plurality of second magnetic materials m2 arranged in the outer peripheral region 230 thereof. Particularly, the second magnetic materials m2 may be accommodated in the first support structure so as to be spaced apart from each other along the circumferential direction of the outer peripheral region. The second magnetic materials m2 may be, for example, permanent magnets that have North and South poles. The second magnetic materials may be arranged at various intervals depending on the arrangement of the first magnetic materials. The second magnetic materials m2 may have the same or a different polarity from the first magnetic materials m1.

Figure 9:
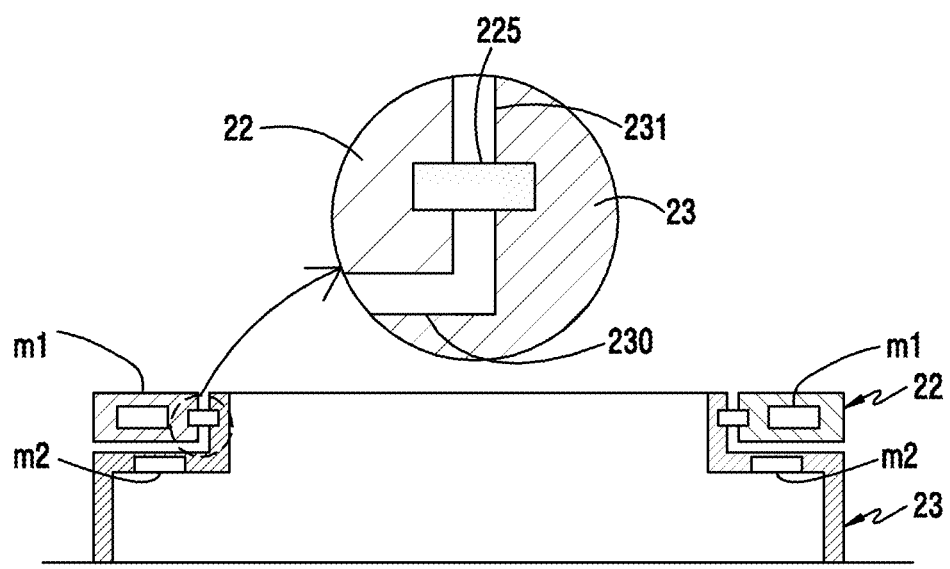
FIG. 9 is a cross-sectional view illustrating a state in which the rotating body is mounted on the first support structure, according to various embodiments of the present disclosure.

FIG. 9 is a cross-sectional view illustrating a state in which the rotating body is mounted on the first support structure, according to various embodiments of the present disclosure.

Referring to FIG. 9, the rotating body 22 is disposed above the first support structure 23 with a slight gap in between. The rotating body 22 may be mounted so as to be spaced a gap apart from the first and second surfaces 230 and 231 of the first support structure 23 by a connecting member 225. The rotating body 22 may be mounted so as to be rotatable while being restricted to the first support structure 23 by the connecting member 225. Furthermore, the rotating body 22 may be mounted so as to be suspended from the first support structure 23 by the connecting member 225. The connecting member 225 may have a annular shape and may be formed of a metal material such as stainless steel. In addition, the outer peripheral portion of the connecting member 225 may be connected to the rotating body 22, and the inner peripheral portion thereof may be connected to the first support structure 23. The connecting member 225 may be formed of a resilient material, or may be formed in a shape that has resilience. However, the rotating body 22 may be directly coupled to the first support structure 23 so as to be rotatable without the connecting member 225 between the rotating body 22 and the first support structure 23.

Figure 10:
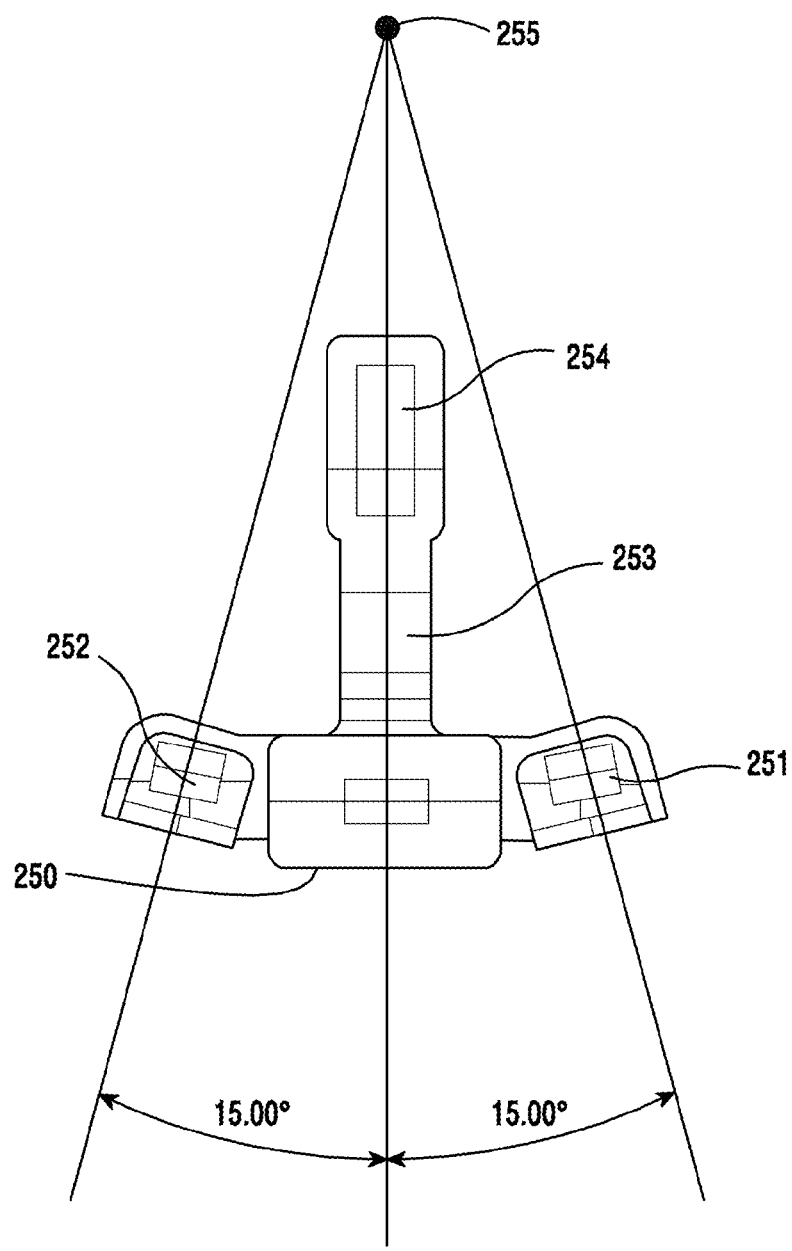
FIG. 10 illustrates an optical sensor and two magnetic sensors that constitute a sensor unit mounted on a support structure, according to various embodiments of the present disclosure.

FIG. 10 illustrates the optical sensor and the two magnetic sensors that constitute the sensor unit mounted on the support structure, according to various embodiments of the present disclosure.

Referring to FIG. 10, the sensor unit 25 includes the optical sensor 250 and the one or more magnetic sensors 251 and 252 as described above. The sensor unit 25 may include the optical sensor 250 and the two magnetic sensors 251 and 252 that are disposed on the opposite sides of the optical sensor 250. For example, the optical sensor 250, according to the various embodiments of the present disclosure, may be an Optical Finger Mouse (OFM), and the detailed structure thereof will be described below. The magnetic sensors 251 and 252 may include Hall effect sensors. The optical sensor 250 may be a device that detects the amount or direction of rotation of the rotating body 22 by using an optical pattern. The magnetic sensors 251 and 252 may be used to correct the rotation recognition value of the optical sensor 250 by detecting the magnetic forces applied by the first magnetic materials m1.

The sensor unit 25 may include the optical sensor 250, the first and second magnetic sensors 251 and 252, a flexible printed circuit board 253, and a connector 254. The optical sensor 250 and the first and second magnetic sensors 251 and 252 may be disposed on at least a part of the flexible printed circuit board 253, and the connector 254 may be disposed on an end portion of the flexible printed circuit board 253. In this case, the optical sensor 250 and the two magnetic sensors 251 and 252 may be arranged to be spaced apart from each other on a circumference that has a predetermined diameter with respect to the center of rotation 255 (along the circumferential direction). The sensors may be arranged on the flexible printed circuit board 253 with a rotation angle of 15 degrees in between.

Figure 11:
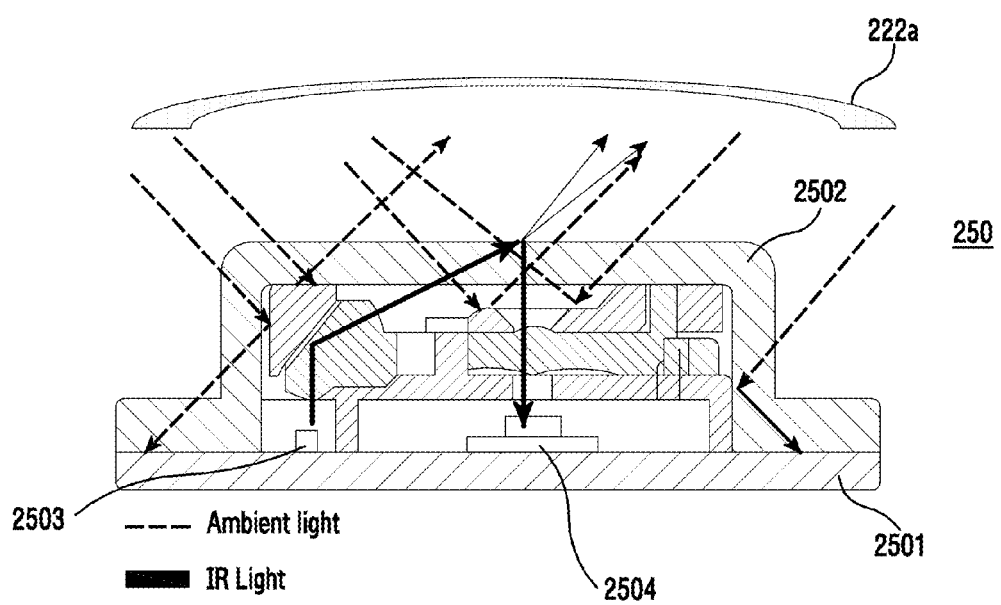
FIG. 11 illustrates the configuration of a typical optical sensor unit according to various embodiments of the present disclosure.

FIG. 11 is a cross-sectional view illustrating the configuration of a typical optical sensor according to various embodiments of the present disclosure.

Referring to FIG. 11, the optical sensor 250 includes a substrate 2501, a housing 2502, a light emitting part 2503, and a light receiving part 2504. The optical sensor 250 may recognize the rotation of the rotating body through image processing when the light emitted from the light emitting part 2503 travels through a plurality of waveguide members and is then input to the light receiving part 2504 by reflection from the optical pattern 222a. At the same time, the magnetic sensors may detect the magnetic forces generated by the first magnetic materials of the rotating body. In this case, the optical sensor 250 may be used to correct the rotation recognition value using the magnetic forces of the first magnetic materials that are detected by the magnetic sensors.

The optical sensor 250 and the magnetic sensors 251 and 252 of the sensor unit 25 may have operating states, such as an active mode (IDLE), a sleep mode (RDY (sleep)), and a stop mode (OFF). In the case of the optical sensor 250, the active mode refers to a state in which the light emitting part and the light receiving part of the sensor are operating, and the sleep mode refers to a state in which the light emitting part and the light receiving part are idle. The light emitting part and the light receiving part that are idle may be activated into the active mode by an external wake-up signal, wherein the wake-up signal may be generated by the execution of an application program and an operating system (OS).

Figure 12:
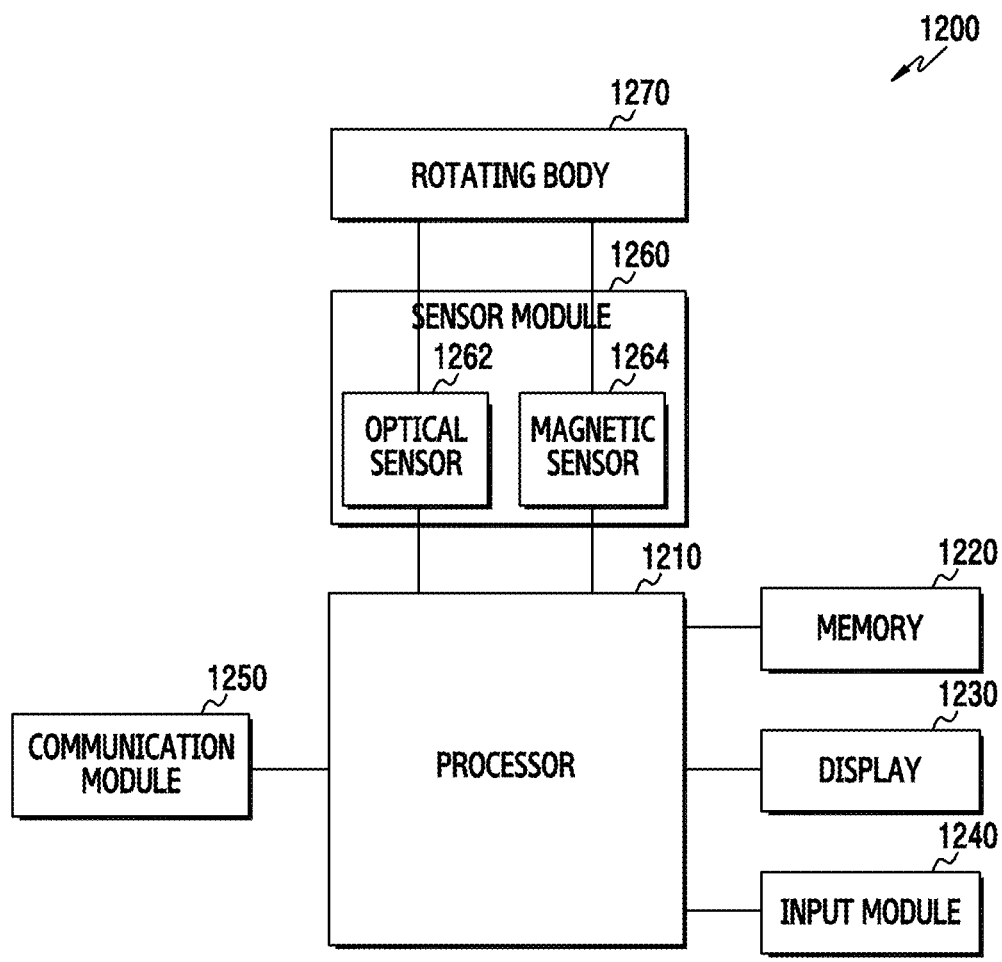
FIG. 12 is a block diagram of an electronic device for controlling rotation recognition units according to various embodiments of the present disclosure.

FIG. 12 is a block diagram of an electronic device for controlling rotation recognition units according to various embodiments of the present disclosure.

Referring to FIG. 12, the electronic device 1200 (e.g., the electronic device 101A of FIG. 1, the electronic device 201A of FIG. 2, or the electronic device 400 of FIG. 4A) includes a processor 1210, a memory 1220, a display 1230, an input module 1240, a communication module 1250, a sensor module 1260, and a rotating body 1270.

The electronic device 1200 may include at least one processor 1210 (e.g., the processor 120A of FIG. 1). The processor 1210 may include a Central Processing Unit (CPU), an Application Processor (AP), or a Communication Processor (CP).

The processor 1210 may detect a rotation parameter of the rotating body 1270 by using at least one of an optical sensor 1262 and a magnetic sensor 1264 that are included in the sensor module 1260. For example, the processor 1210 may accurately detect the accurate rotation parameter of the rotating body 1270 by using the optical sensor 1262 and the magnetic sensor 1264. For example, the processor 1210 may also detect the rotation parameter of the rotating body 1270 with low power using the magnetic sensor 1264 only.

The processor 1210 may analyze a first output signal received from the optical sensor 1262 (an electrical signal generated by the optical sensor 1262) to identify whether the rotating body 1270 has rotated. For example, the processor 1210 may perform an image processing operation on the first output signal to identify an optical pattern and may compare the identified optical pattern with the previously stored optical pattern. In cases where the optical patterns are identical to each other, the processor 1210 may determine that the rotating body 1270 has not rotated. In cases where the optical patterns are different from each other, the processor 1210 may determine that the rotating body 1270 has rotated.

When determining that the rotating body 1270 has not rotated, the processor 1210 may repeatedly perform the operation of receiving the first output signal from the optical sensor 1262.

When determining that the rotating body 1270 has rotated, the processor 1210 may estimate the rotation value (rotation parameter) based on the first output signal. For example, the processor 1210 may estimate the rotation value based on the current optical pattern, which has been identified through the analysis of the first output signal and the previous optical pattern.

The processor 1210 may estimate an auxiliary rotation value based on second and third output signals that are received from the magnetic sensor 1264. Here, the auxiliary rotation value may include the amount (angle) and direction of auxiliary rotation of the rotating body 1270. For example, the processor 1210 may estimate the direction of auxiliary rotation based on the waveform values of the second and third output signals. Specifically, in cases where the waveform values of the second and third output signals are included in a signal table for the counterclockwise rotation, which is stored in the memory 1220, the processor 1210 may determine that the rotating body 1270 has rotated in the counterclockwise direction.

The processor 1210 may estimate the amount of auxiliary rotation of the rotating body 1270 depending on the second and third output signals and the angles at which magnets attached to the rotating body are arranged.

The processor 1210 may determine the final rotation value based on the rotation value and the auxiliary rotation value. For example, in cases where the rotational direction of the rotation value is the clockwise direction, and the auxiliary rotational direction of the auxiliary rotation value is the counterclockwise direction, the processor 1210 may determine the direction of rotation of the rotating body 1270 to be the counterclockwise direction according to the auxiliary rotation value.

The processor 1210 may select one of the user modes of the electronic device 1200 based on the final rotation value and may display a screen for the selected mode. The user modes refer to various modes that the electronic device may provide, and may include, for example, a telephone call mode, an exercise mode, a sleep mode, etc. For example, if the exercise mode is selected, the processor 1210 may display a screen or output a voice to inform the user that the current mode is the exercise mode.

As described above, the processor 1210 may accurately select the user mode according to the rotation of the rotating body 1270 by determining the final rotation value based on the output signal that is received from the optical sensor 1262 and the output signals that are output from the magnetic sensor 1264.

According to an embodiment of the present disclosure, the processor 1210 may measure the speed of rotation of the rotating body 1270. For example, the processor 1210 may measure the speed of rotation of the rotating body 1270 using an acceleration sensor equipped to the electronic device 1200, or may measure the speed of rotation of the rotating body 1270 based on the output signal received from the optical sensor 1262.

The processor 1210 may control the operation of the sensor module 1260 for detecting the rotation parameter of the rotating body 1270 based on control information according to the operation of the electronic device 1200. For example, the processor 1210 may determine the operating modes of the optical sensor 1262 and the magnetic sensor 1264 for detecting the rotation parameter of the rotating body 1270 based on the control information according to the operation of the electronic device. The control information according to the operation of the electronic device may include information on whether a continuous graphic effect (e.g., switching a screen or moving an object) is provided.

The processor 1210 may control the operation of the sensor module 1260 based on the property of an application program that is being executed in the electronic device 1200. For example, the processor 1210 may identify whether the application program that is being executed in the electronic device 1200 requires continuous screen switching (e.g., UI control). For example, the processor 1210 may identify whether the corresponding application program requires the continuous screen switching based on the setting variables of the application program or the type of application program. In cases where the corresponding application program requires the continuous screen switching, the processor 1210 may set the operating modes of the optical sensor 1262 and the magnetic sensor 1264 to an active mode (IDLE). In cases where the corresponding application program does not require the continuous screen switching, the processor 1210 may set the operating mode of the optical sensor 1262 to a sleep mode (RDY: ready) and the operating mode of the magnetic sensor 1264 to an active mode.

The processor 1210 may control the operation of the sensor module 1260 based on the property of a service provided by the application program that is being executed in the electronic device 1200. For example, the processor 1210 may identify whether the service of the application program that is being executed in the electronic device 1200 requires continuous screen switching (e.g., UI control). In cases where the service of the corresponding application program requires the continuous screen switching, the processor 1210 may set the operating modes of the optical sensor 1262 and the magnetic sensor 1264 to an active mode. In cases where the service of the corresponding application program does not require the continuous screen switching, the processor 1210 may set the operating mode of the optical sensor 1262 to a sleep mode and the operating mode of the magnetic sensor 1264 to an active mode.

The processor 1210 may control the operation of the sensor module 1260 based on the User Interface (UI) mode of the electronic device 1200. For example, the UI mode includes a first mode for continuously controlling a UI (e.g., switching a screen or moving an object) using a preset graphic effect of the electronic device 1200, a second mode for discontinuously controlling a UI, and a third mode for adaptively controlling a UI. In cases where the electronic device 1200 is set to the first mode, the processor 1210 may set the operating modes of the optical sensor 1262 and the magnetic sensor 1264 to an active mode in order to continuously control a UI. In cases where the electronic device 1200 is set to the second mode, the processor 1210 may set the operating mode of the optical sensor 1262 to a sleep mode and the operating mode of the magnetic sensor 1264 to an active mode in order to reduce the power consumption of the sensor module 1260. In cases where the electronic device 1200 is set to the third mode, the processor 1210 may set the operating modes of the optical sensor 1262 and the magnetic sensor 1264 based on at least one of the property of an application program, the service property of the application program, and the battery residual quantity.

The processor 1210 may control the operation of the sensor module 1260 based on the battery residual quantity of the electronic device 1200. For example, in cases where the battery residual quantity of the electronic device 1200 is greater than a reference battery residual quantity, the processor 1210 may set the operating modes of the optical sensor 1262 and the magnetic sensor 1264 to an active mode. In cases where the battery residual quantity of the electronic device 1200 is less than, or equal to, the reference battery residual quantity, the processor 1210 may set the operating mode of the optical sensor 1262 to a sleep mode and the operating mode of the magnetic sensor 1264 to an active mode. For example, the reference battery residual quantity is a reference value for setting the operating modes of the optical sensor 1262 and the magnetic sensor 1264, and may be changed based on the type of electronic device 1200 and the property of an application program that is executed in the electronic device 1200.

The processor 1210 may control the operation of the sensor module 1260 based on the active mode of the electronic device 1200. For example, the active mode may represent an application program or a UI mode to be executed when the electronic device that is in a sleep state detects an activation event. For example, in cases where the electronic device 1200 is in a sleep state, the processor 1210 may set the operating mode of the optical sensor 1262 to a sleep mode and the operating mode of the magnetic sensor 1264 to an active mode in order to reduce the power consumption of the sensor module 1260. In cases where the electronic device 1200 that is in the sleep state is awakened from the sleep state, the processor 1210 may identify the active mode. In cases where the active mode requires continuous screen switching, the processor 1210 may set the operating modes of the optical sensor 1262 and the magnetic sensor 1264 to an active mode for the continuous screen switching. In cases where the active mode does not require the continuous screen switching, the processor 1210 may set the operating mode of the optical sensor 1262 to a sleep mode and the operating mode of the magnetic sensor 1264 to an active mode in order to reduce the power consumption of the sensor module 1260. The application program to be executed may include at least one of the preset application program to be executed when the electronic device 1200 is awakened, the application program that was being executed when the electronic device changed to the sleep state, and the application program corresponding to the activation event (e.g., the rotation parameter for activation).

The processor 1210 may adaptively detect the rotation parameter of the rotating body 1270 based on the operating modes of the optical sensor 1262 and the magnetic sensor 1264. For example, in cases where the operating mode of the optical sensor 1262 or the magnetic sensor 1264 is set to an active mode, the processor 1210 may detect the rotation parameter of the rotating body 1270 using the sensor 1262 or 1264 set to the active mode. In cases where the operating modes of the optical sensor 1262 and the magnetic sensor 1264 are set to an active mode, the processor 1210 may correct the rotation parameter of the rotating body 1270 that has been detected through the optical sensor 1262 by using the rotation parameter of the rotating body 1270 that has been detected through the magnetic sensor 1264. The processor 1210 may provide a service that corresponds to the corrected rotation parameter. For example, the service corresponding to the corrected rotation parameter may include at least one of operating a function associated with the corrected rotation parameter, executing an application program, and changing a mode.

The memory 1220 may store instructions or data associated with the elements that constitute the electronic device.

The memory 1220 may store, in advance, reference values for outputting different screens according to the speed of rotation of the rotating body 1270. The memory 1220 may store a signal table for estimating the direction of rotation of the rotating body based on a signal output from the magnetic sensor 1264.

The display 1230 may display various types of content (e.g., text, images, videos, icons, symbols, etc.) to a user.

The input module 1240 may forward instructions or data for controlling the operation of the electronic device, which is input from a user or an external device, to the other element(s) of the electronic device. For example, the input module 1240 may include a keypad, a dome switch, a physical button, a (capacitive/resistive type) touch pad, a jog & shuttle, etc.

The communication module 1250 may transmit and receive signals between the electronic device 1200 and an external device (e.g., an external electronic device or a server). For example, the communication module 1250 may be connected to a network through wireless or wired communication to communicate with the external device.

The sensor module 1260 may convert information acquired by measuring a physical quantity or information acquired by detecting the operating state of the electronic device into an electrical signal to generate sensing data. The sensor module 1260 may include the optical sensor 1262 and the magnetic sensor 1264. For example, the optical sensor 1262, which includes a light emitting part and a light receiving part, may project an optical signal through the light emitting part and may receive the optical signal, through the light receiving part, which is reflected by an optical pattern attached to one surface of the rotating body 1270. The optical sensor 1262 may convert the received optical signal into an electrical signal and may output the converted electrical signal to the processor 1210. For example, the magnetic sensor 1264 may detect the rotation of the rotating body 1270 by sensing magnetic forces generated by a plurality of magnets that are mounted in the rotating body 1270. The magnetic sensor 1264 may include a Hall effect sensor (Hall IC). For example, the sensor module 1260 may further include a control circuit for controlling at least one sensor included in the sensor module 1260.

The magnetic sensor 1264 may include a plurality of magnetic sensors disposed to be spaced apart from each other, and the magnetic sensors may operate in conjunction with each other or independently.

At least one sensor included in the sensor module 1260 may have operating modes, such as an active mode, a sleep mode, and a stop mode. The sleep mode may represent a standstill state of the sensor module from which the sensor module may change to the active mode by an external activation signal. The stop mode may represent a state in which the sensor module is powered off.

Figure 13:
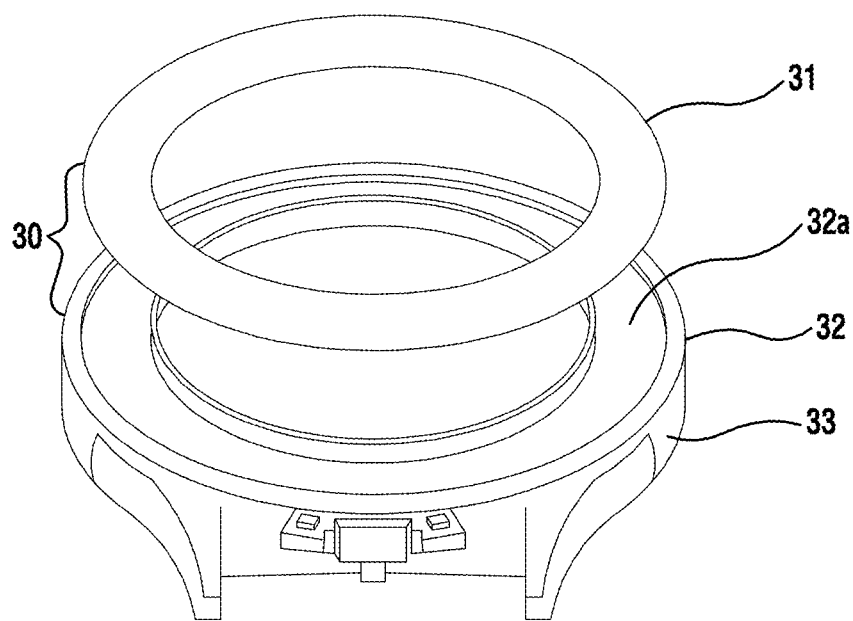
FIG. 13 is a perspective view of another rotating body according to various embodiments of the present disclosure.
Figure 14:
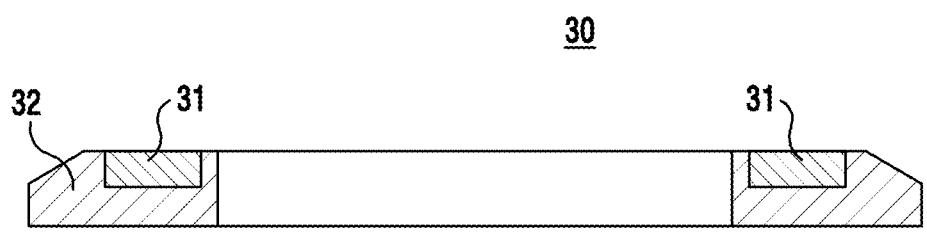
FIG. 14 is a cross-sectional view illustrating a state in which an upper cover is coupled to the rotating body, according to various embodiments of the present disclosure.

FIG. 13 is a perspective view of another rotating body according to various embodiments of the present disclosure. FIG. 14 is a cross-sectional view illustrating a state in which an upper cover is coupled to the rotating body, according to various embodiments of the present disclosure.

Referring to FIGS. 13 and 14, an electronic device includes the rotating body 30 constructed of two pieces. The rotating body 30 may be mounted on a first support structure 33 and may enter various modes according to the amount or direction of rotation thereof. The rotating body 30 may include the upper cover 31 exposed to the outside and a rotating operation body 32. The upper cover 31 may be vertically coupled to the rotating operation body 32 to integrally rotate with the rotating operation body 32. The upper cover 31 may be formed of a ceramic material or a synthetic resin.

The rotating body 30, according to the various embodiments of the present disclosure, may have a plurality of first magnetic materials that are disposed on the upper cover 31 or the rotating operation body 32. The rotating operation body 32 may have a receiving space 32a in which the upper cover 31 is positioned. The upper cover 31 may include an indicator to visually indicate the amount or direction of rotation of the rotating body 30. The indicator may be marked or imprinted on the upper cover 31, or may be displayed through a printing method.

Figure 15:
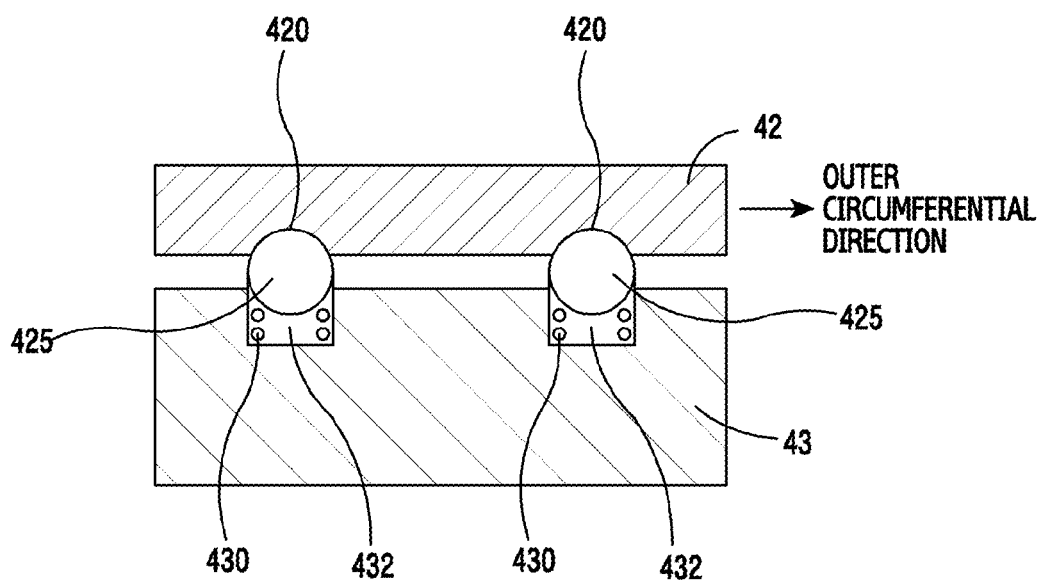
FIG. 15 is a cross-sectional view of a mechanical structure that generates a click-feeling from the rotation of a rotating body, according to various embodiments of the present disclosure.

FIG. 15 is a cross-sectional view of a mechanical structure that generates a click-feeling to the rotation of a rotating body, according to various embodiments of the present disclosure.

Referring to FIG. 15, an electronic device employs a plurality of balls 425, instead of a plurality of magnetic materials, in order to generate a click-feeling to the rotation of a rotating body 42. In the electronic device, according to the various embodiments of the present disclosure, a support structure 43 may have a plurality of recesses 432 formed therein in order for the plurality of balls 425 to be arranged spaced apart from each other in the outer peripheral region of the support structure 43. Resilient members 430 may be disposed in the recesses 432 to support the balls 425 accommodated in the recesses, respectively. Meanwhile, the rotating body 42 may have a plurality of recesses 420 that are formed in the rear surface thereof so as to be spaced apart from each other, and a part of each ball 425 is inserted into the corresponding recess. When the balls 425 are engaged with, or disengaged from, the respective recesses 420, a click-feeling to the rotation of the rotating body 42 may be generated. When the rotating body 42 rotates, the balls 425 may move upward and downward in the recesses 432, respectively.

According to various embodiments of the present disclosure, an electronic device may include an outer housing, a rotary member disposed to be adjacent to, or to be brought into at least partial contact with, the housing, a first sensor that detects the rotation of the rotary member relative to the housing through a first physical change, a second sensor that detects the rotation of the rotary member relative to the housing through a second physical change, a battery disposed in the housing, a processor electrically connected to the battery, the first sensor, and the second sensor, and a memory electrically connected to the processor, wherein the memory may store instructions that, when executed, make the processor selectively control the operation of the first and/or second sensor based on at least one of the state of the electronic device and an application program that is being executed by the processor.

In various embodiments of the present disclosure, the first sensor may consume more power than the second sensor, the first sensor may include an optical sensor and the second sensor may include a magnetic force detection sensor.

In various embodiments of the present disclosure, the magnetic force detection sensor may include a plurality of magnetic force detection sensors disposed to be spaced apart from each other.

In various embodiments of the present disclosure, instructions executed by the processor may deactivate one of the first and second sensors at least partially based on whether the electronic device is in a deactivated or activated state.

In various embodiments of the present disclosure, instructions executed by the processor may deactivate one of the first and second sensors at least partially based on at least one of the type, state, and property of the application program executed by the processor.

In various embodiments of the present disclosure, the instructions may make the processor deactivate one of the first and second sensors at least partially based on the residual quantity of the battery or whether the electronic device provides a continuous graphic effect.

In various embodiments of the present disclosure, the electronic device may further include a display that has a screen, at least a part of which is surrounded by the rotary member, wherein the instructions executed by the processor may make the processor change an image displayed on the display at least partially based on a signal received from the first sensor and/or the second sensor.

In various embodiments of the present disclosure, the rotary member may include an optical pattern on one surface thereof and may be formed in the shape of a bezel that is disposed to surround at least a part of a main body that has a plurality of magnetic materials mounted therein.

In various embodiments of the present disclosure, instructions executed by the processor may correct a rotation parameter of the rotary member detected through the first sensor by using a rotation parameter of the rotary member detected through the second sensor when the first and second sensors are in an active state.

In various embodiments of the present disclosure, the rotation parameter may include at least one of the speed, direction, and amount of rotation of the rotary member and the rotated position thereof.

In various embodiments of the present disclosure, instructions executed by the processor may provide a service that corresponds to the corrected rotation parameter of the rotary member.

In various embodiments of the present disclosure, the service corresponding to the rotation parameter may include at least one of operating a function associated with the corrected rotation parameter of the rotary member, operating an application, and changing a mode.

According to various embodiments of the present disclosure, an electronic device may include an outer housing, a rotary member disposed to be adjacent to, or to be brought into at least partial contact with, the housing, a plurality of sensors that detect the rotation of the rotary member relative to the housing through physical changes, a battery disposed in the housing, a processor electrically connected to the battery and the sensors, and a memory electrically connected to the processor, wherein the memory may store instructions that, when being executed, make the processor selectively control the operation of at least a part of the sensors based on at least one of the state of the electronic device and an application program that is being executed by the processor.

According to various embodiments of the present disclosure, an electronic device may include an outer housing, a rotary member disposed to be adjacent to, or to be brought into at least partial contact with, the housing, a first sensor that detects the rotation of the rotary member relative to the housing through a first physical change, a second sensor that detects the rotation of the rotary member relative to the housing through a second physical change, a battery disposed in the housing, a processor electrically connected to the battery, the first sensor, and the second sensor, and a memory electrically connected to the processor, wherein the memory may store instructions that, when being executed, make the processor activate the electronic device based on the rotation of the rotary member that is detected through at least one of the first and second sensors, and selectively control the operation of the first sensor and/or the second sensor based on at least one of the operating mode of the electronic device and an application program thereof that corresponds to the activation.

In various embodiments of the present disclosure, the instructions executed by the processor may deactivate one of the first and second sensors in response to the activation of the electronic device at least partially based on at least one of the type, state, and property of the application program executed by the processor.

In various embodiments of the present disclosure, the instructions executed by the processor may deactivate one of the first and second sensors based on whether the operating mode corresponding to the activation of the electronic device provides a continuous graphic effect.

In various embodiments of the present disclosure, the instructions executed by the processor may determine at least one of the operating mode and the application program that correspond to the activation of the electronic device based on a rotation parameter of the rotary member that is detected through at least one of the first and second sensors, and selectively control the operation of the first sensor and/or the second sensor based on at least one of the determined operating mode and application program.

Figure 16:
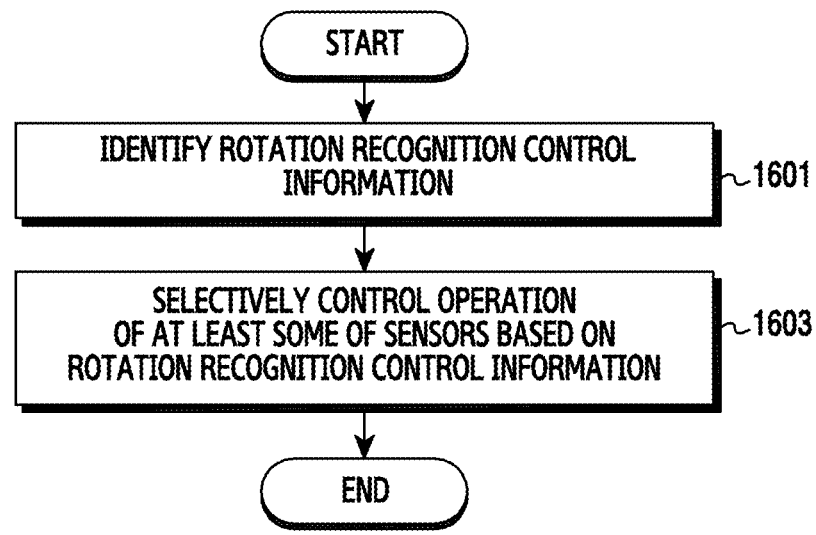
FIG. 16 is a flowchart illustrating a process of selectively controlling at least some sensors in an electronic device according to various embodiments of the present disclosure.

FIG. 16 is a flowchart illustrating a process of selectively controlling at least some sensors in an electronic device according to various embodiments of the present disclosure.

Referring to FIG. 16, in operation 1601, the electronic device (e.g., the electronic device 101A, 201A, 400, or 1200) identifies rotation recognition control information according to the operation thereof. For example, the rotation recognition control information may include at least one of the state of the electronic device, the type, state, or property of an application program executed by the processor 1210 of the electronic device, and the battery residual quantity or active mode of the electronic device.

In operation 1603, based on the rotation recognition control information, the electronic device selectively controls the operation of at least one of the plurality of sensors (rotation recognition units) that may recognize the rotation of the rotating body. For example, the processor 1210 may deactivate one of the first and second sensors that may recognize the rotation of the rotating body, based on whether the electronic device 1200 is in an activated state or in a deactivated state. In another example, the processor 1210 may deactivate one of the first and second sensors that may recognize the rotation of the rotating body, based on at least one of the type, state, and property of an application program that is executed in the electronic device 1200. In yet another example, the processor 1210 may deactivate one of the first and second sensors that may recognize the rotation of the rotating body, based on the battery residual quantity of the electronic device 1200. The first and second sensors may include, for example, different types of sensors (e.g., the optical sensor 1262 and the magnetic sensor 1264), or the same type of sensors (e.g., a plurality of magnetic sensors).

Figure 17:
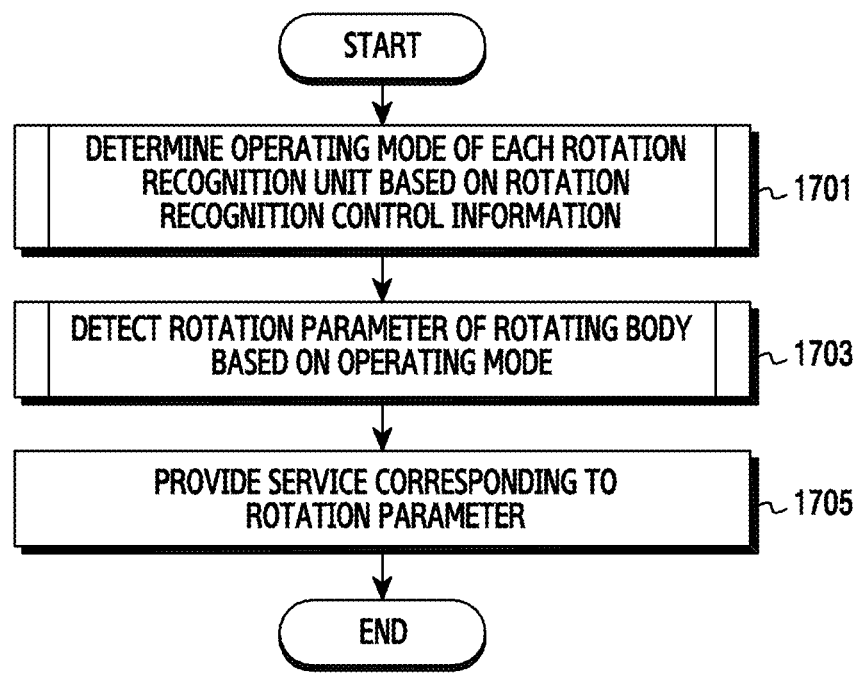
FIG. 17 is a flowchart illustrating a process of controlling rotation recognition units in an electronic device according to various embodiments of the present disclosure.

FIG. 17 is a flowchart illustrating a process of controlling rotation recognition units in an electronic device according to various embodiments of the present disclosure.

Referring to FIG. 17, in operation 1701, the electronic device (e.g., the electronic device 101A, 201A, 400, or 1200) determines the operating modes of the respective rotation recognition units for detecting a rotation parameter of the rotating body, based on control information according to the operation of the electronic device. For example, the processor 1210 may set the operating modes of the optical sensor 1262 and the magnetic sensor 1264 for detecting the rotation parameter (rotation value) of the rotating body that constitutes the electronic device. For example, in cases where the electronic device includes a plurality of magnetic sensors 1264, the processor 1210 may set the operating mode of each magnetic sensor. The control information (rotation recognition control information) according to the operation of the electronic device may include at least one of the property, type or state of an application program, the property, type, or state of the service of the application program, a UI mode, the battery residual quantity, and an active mode.

In operation 1703, the electronic device detects the rotation parameter of the rotating body based on the operating modes of the respective rotation recognition units. For example, in cases where the operating modes of the optical sensor 1262 and the magnetic sensor 1264 are set to an active mode, the processor 1210 may correct the rotation parameter of the rotating body that has been detected through the optical sensor 1262 by using the rotation parameter of the rotating body that has been detected through the magnetic sensor 1264. For example, in cases where the operating mode of the magnetic sensor 1264 is set to an active mode, the processor 1210 may detect the rotation parameter of the rotating body through the magnetic sensor 1264. The rotation parameter of the rotating body may include at least one of the direction, speed, and amount of rotation of the rotating body and the rotated position thereof.

In operation 1705, the electronic device provides a service that corresponds to the rotation parameter of the rotating body that has been detected through the rotation recognition units. For example, the processor 1210 may perform at least one of operating a function associated with the rotation parameter detected through at least one rotation recognition unit, executing an application program, and changing a mode.

Figure 18:
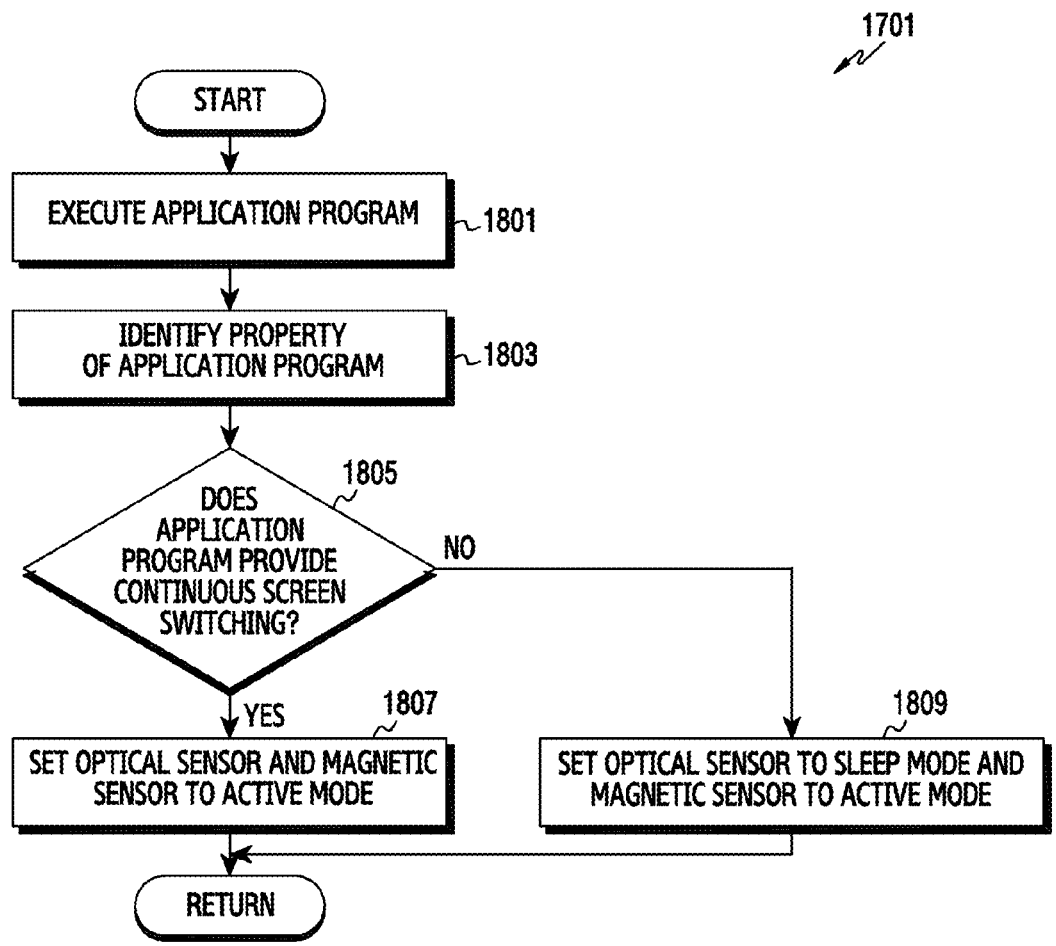
FIG. 18 is a flowchart illustrating a process of determining the operating modes of rotation recognition units based on the type of application program in an electronic device according to various embodiments of the present disclosure.

FIG. 18 is a flowchart illustrating a process of determining the operating modes of rotation recognition units based on the type of application program in an electronic device according to various embodiments of the present disclosure. Hereinafter, determining the operating modes of the rotation recognition units in operation 1701 of FIG. 17 will be described by using screen configurations illustrated in FIGS. 19A to 19C.

Referring to FIG. 18, in operation 1801, the electronic device (e.g., the electronic device 101A, 201A, 400, or 1200) executes an application program. For example, the processor 1210 may execute an application program that corresponds to input information detected through the input module 1240 among the application programs installed in the electronic device 1200.

In operation 1803, the electronic device identifies the property of the running application program. For example, the processor 1210 may identify a pre-defined setting variable among the elements of the application program. For example; the processor 1210 may identify the type of application program. The setting variable may represent a variable that corresponds to a screen switching property (e.g., a UI control property) for the execution of the application program, which has been pre-defined by the developer of the application program.

In operation 1805, based on the property of the application program, the electronic device identifies whether the corresponding application program requires continuous screen switching (e.g., UI control). For example, based on the predefined setting variable of the application program, the processor 1210 may identify whether the corresponding application program requires the continuous screen switching. For example, the processor 1210 may identify whether the corresponding application program requires the continuous screen switching by using a table in which whether continuous screen switching is needed is determined according to the types of application programs.

Figure 19A:
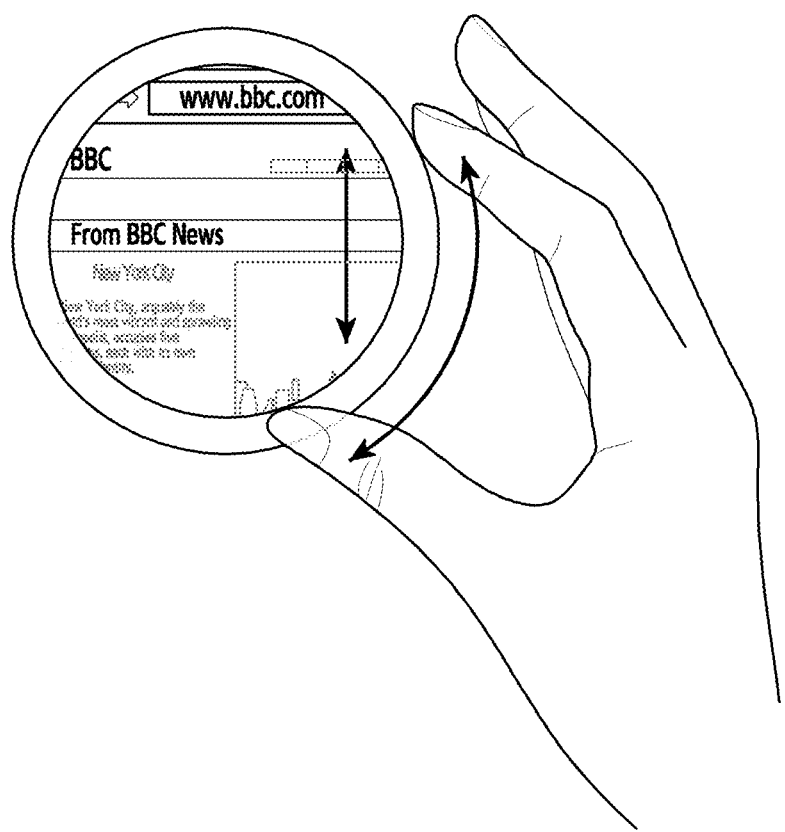
FIGS. 19A to 19C illustrate screen configurations depending on the types of application programs, according to various embodiments of the present disclosure.
Figure 19B:
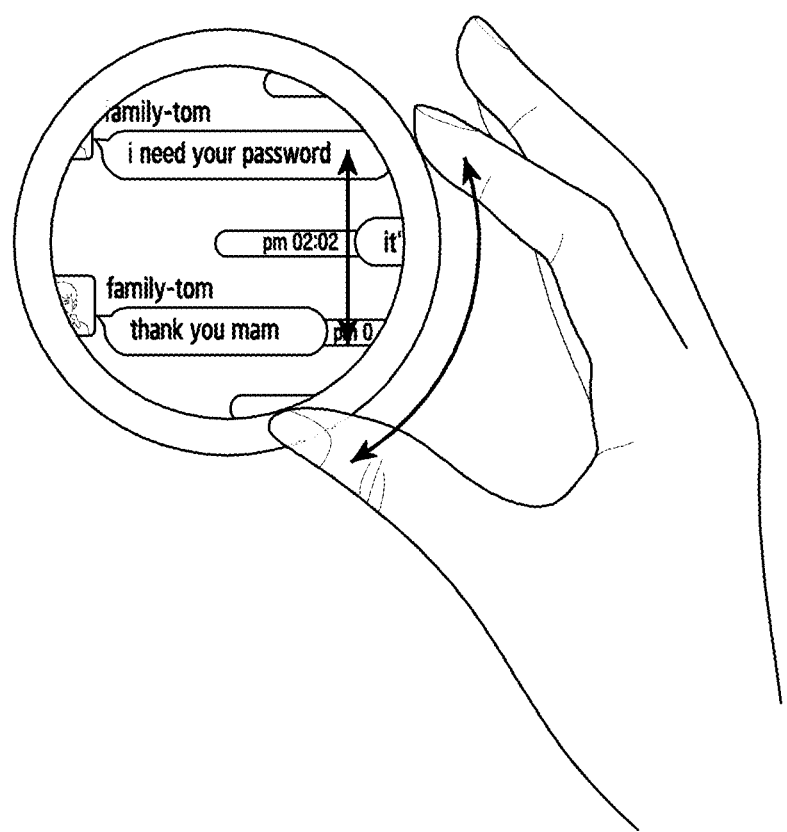

When it is identified that the application program requires the continuous screen switching (e.g., UI control), the electronic device sets the operating modes of the optical sensor 1262 and the magnetic sensor 1264 to an active mode in operation 1807. For example, in cases where the electronic device executes a browser application that requires continuous screen switching, such as a scroll, as illustrated in FIG. 19A, the processor 1210 may set the operating modes of the optical sensor 1262 and the magnetic sensor 1264 to an active mode. For example, in cases where the electronic device executes a messenger application that requires continuous screen switching, such as a scroll, as illustrated in FIG. 19B, the processor 1210 may set the operating modes of the optical sensor 1262 and the magnetic sensor 1264 to an active mode. Accordingly, the electronic device may detect the accurate rotation parameter of the rotating body.

Figure 19C:
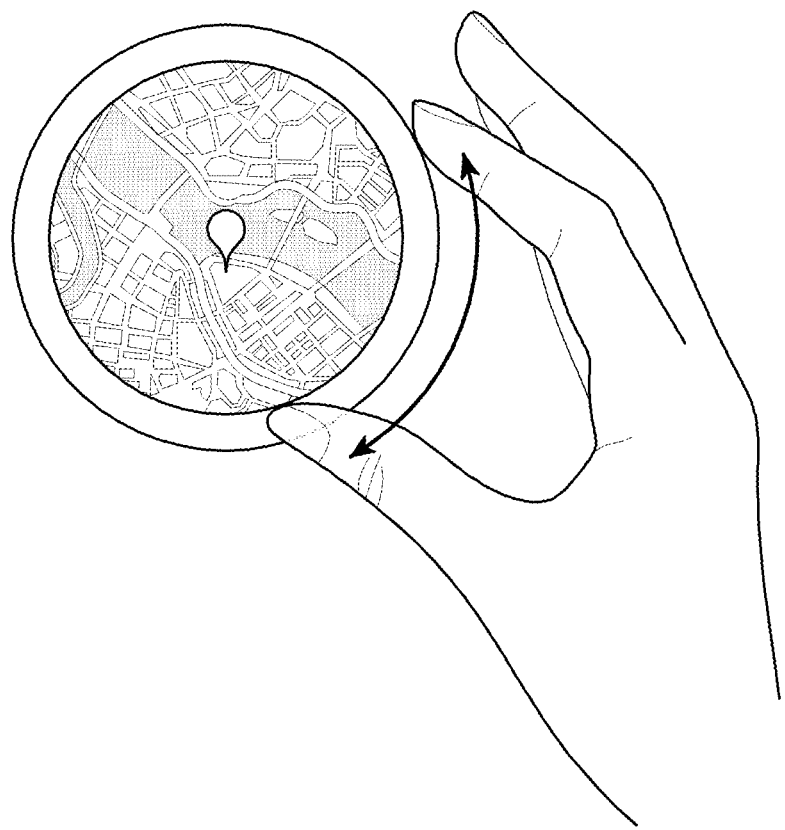

When it is identified that the application program does not require the continuous screen switching, the electronic device sets the operating mode of the optical sensor 1262 to a sleep mode and the operating mode of the magnetic sensor 1264 to an active mode in operation 1809. For example, in cases where the electronic device executes a map application that requires discontinuous screen switching, such as zoom-in, as illustrated in FIG. 19C, the processor 1210 may set the operating mode of the optical sensor 1262 to a sleep mode and the operating mode of the magnetic sensor 1264 to an active mode. Accordingly, the electronic device may reduce the power consumption required for detecting the rotation parameter of the rotating body.

Figure 20:
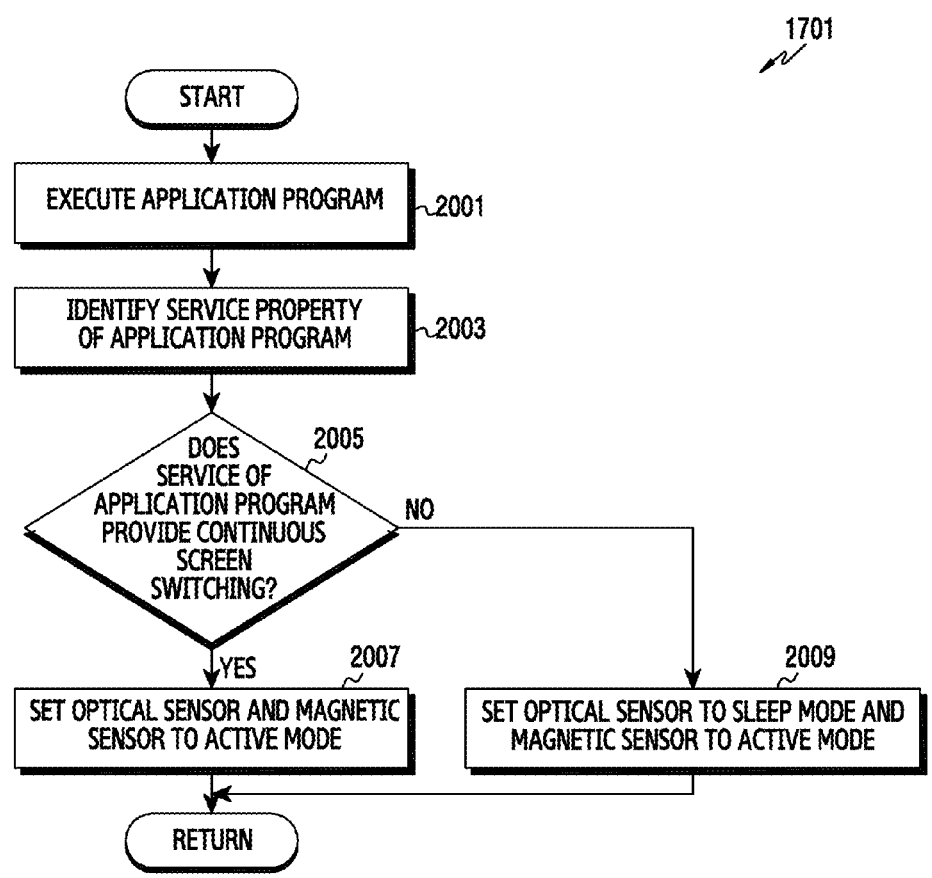
FIG. 20 is a flowchart illustrating a process of determining the operating modes of rotation recognition units based on the service type of application program in an electronic device according to various embodiments of the present disclosure.

FIG. 20 is a flowchart illustrating a process of determining the operating modes of rotation recognition units based on the service type of application program in an electronic device according to various embodiments of the present disclosure. Hereinafter, determining the operating modes of the rotation recognition units in operation 1701 of FIG. 17 will be described by using screen configurations illustrated in FIGS. 21A and 21B.

Referring to FIG. 20, in operation 2001, the electronic device (e.g., the electronic device 101A, 201A, 400, or 1200) executes an application program. For example, the processor 1210 may execute an application program that corresponds to input information detected through the input module 1240.

In operation 2003, the electronic device identifies the service property of the running application program. For example, the processor 1210 may identify a pre-defined setting variable that corresponds to a service, which is being provided, among the elements of the application program. For example, the processor 1210 may identify the service type of application program.

In operation 2005, based on the service property of the application program, the electronic device identifies whether the service of the corresponding application program requires continuous screen switching (e.g., UI control).

Figure 21A:
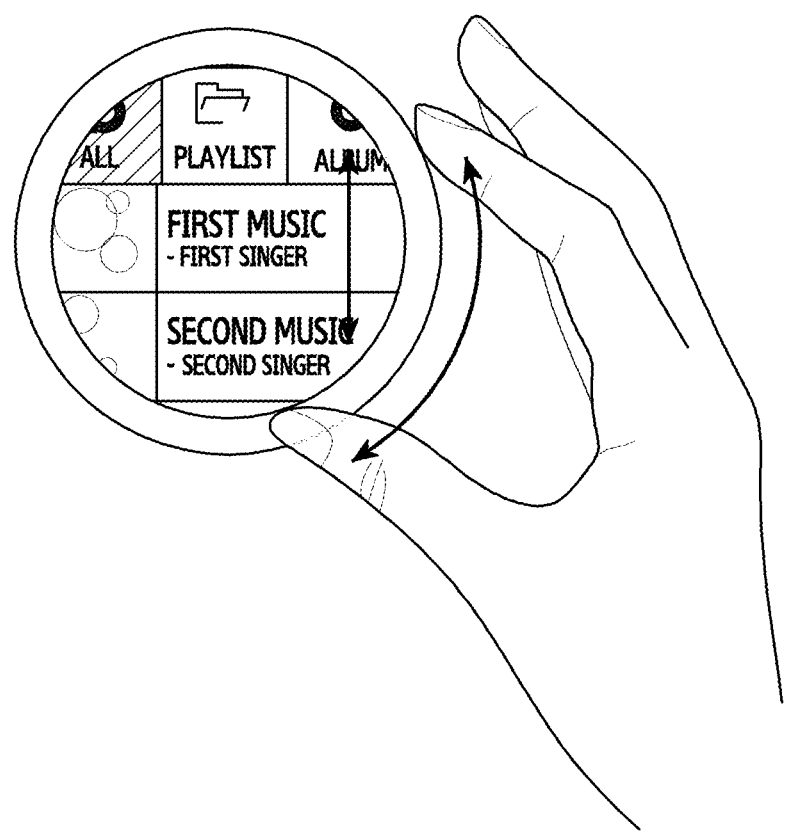
FIGS. 21A and 21B illustrate screen configurations depending on the service types of application programs, according to various embodiments of the present disclosure.

When it is identified that the service of the application program requires the continuous screen switching (e.g., UI control), the electronic device sets the operating modes of the optical sensor 1262 and the magnetic sensor 1264 to an active mode in operation 2007. For example, as illustrated in FIG. 21A, the processor 1210 may execute a music playback application in the electronic device to provide a playlist service. For the continuous screen switching (e.g., scroll) of the playlist, the processor 1210 may set the operating modes of the optical sensor 1262 and the magnetic sensor 1264 to an active mode.

Figure 21B:
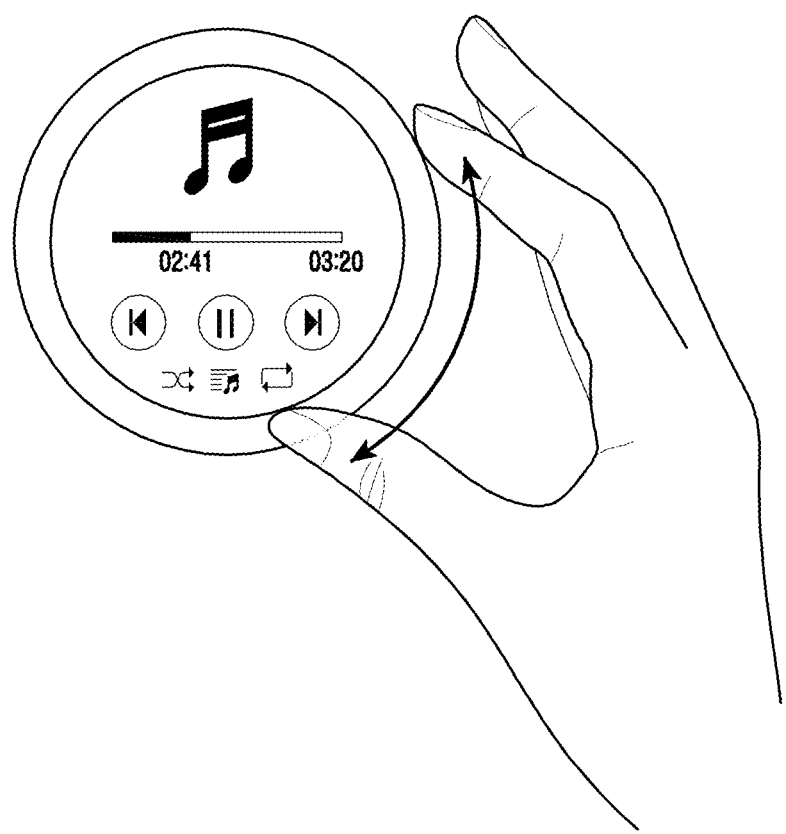

When it is identified that the service of the application program does not require the continuous screen switching, the electronic device may set the operating mode of the optical sensor 1262 to a sleep mode and the operating mode of the magnetic sensor 1264 to an active mode in operation 2009. For example, as illustrated in FIG. 21B, the processor 1210 may execute a music playback application in the electronic device to provide a music search service (navigation). Since the continuous screen switching is not required to search for music, the processor 1210 may set the operating mode of the optical sensor 1262 to a sleep mode and the operating mode of the magnetic sensor 1264 to an active mode. Accordingly, the electronic device may reduce the power consumption required for detecting the rotation parameter of the rotating body.

Figure 22:
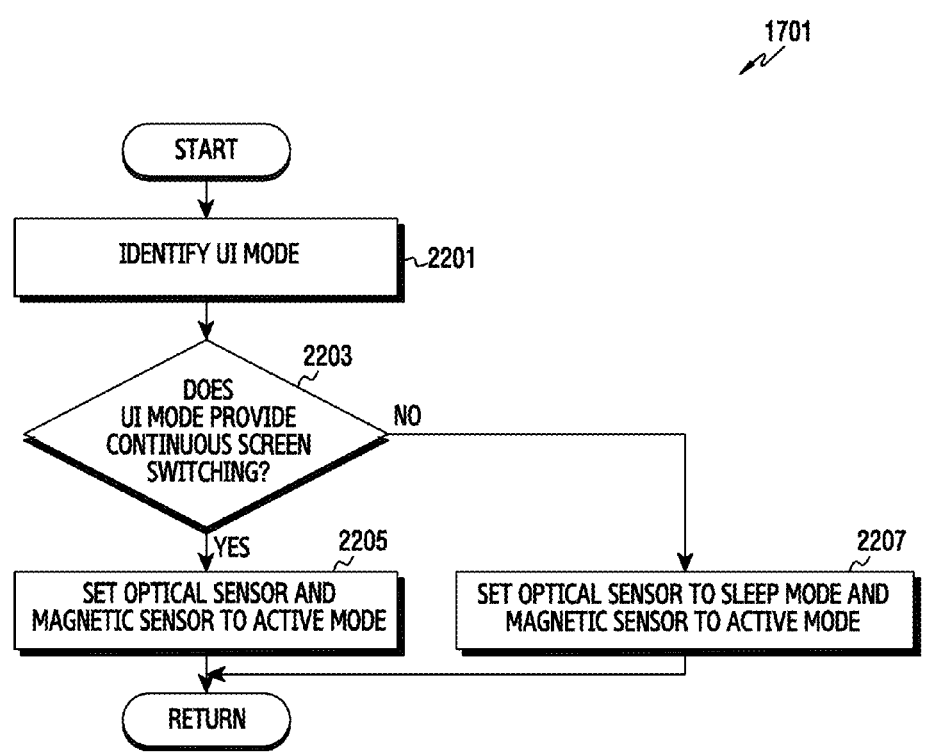
FIG. 22 is a flowchart illustrating a process of determining the operating modes of rotation recognition units based on a UI mode in an electronic device according to various embodiments of the present disclosure.

FIG. 22 is a flowchart illustrating a process of determining the operating modes of rotation recognition units based on a UI mode in an electronic device according to various embodiments of the present disclosure. Hereinafter, determining the operating modes of the rotation recognition units in operation 1701 of FIG. 17 will be described by using screen configurations illustrated in FIGS. 23A and 23B.

Referring to FIG. 22, in operation 2201, the electronic device (e.g., the electronic device 101A, 201A, 400, or 1200) identifies a UI mode for the operation of the electronic device. For example, the processor 1210 may identify a preset UI mode using input information detected through the input module 1240. For example, the processor 1210 may identify a UI mode that is basically set for the electronic device. The UI mode, which defines a graphic effect of the electronic device, may include a first mode (e.g., a "natural" mode) 2300 for continuous UI control (e.g., switching a screen or moving an object), which is illustrated in FIG. 23A, and a second mode (e.g., a "classic" mode) 2310 for discontinuous UI control, which is illustrated in FIG. 23B.

In operation 2203, the electronic device identifies whether the UI mode requires continuous screen switching (e.g., UI control).

When it is identified that the UI mode of the electronic device requires the continuous screen switching (e.g., UI control), the electronic device may set the operating modes of the optical sensor 1262 and the magnetic sensor 1264 to an active mode in operation 2205. For example, in cases where the electronic device is set to the first mode that requires continuous UI control (screens 2302 and 2304) as illustrated in FIG. 23A, the processor 1210 may set the operating mode of the optical sensor 1262 and the magnetic sensor 1264 to an active mode for the continuous UI control (e.g., switching a screen or moving an object).

When it is identified that the UI mode of the electronic device does not require the continuous screen switching, the electronic device sets the operating mode of the optical sensor 1262 to a sleep mode and the operating mode of the magnetic sensor 1264 to an active mode in operation 2207. For example, in cases where the electronic device is set to the second mode that requires discontinuous UI control (screens 2312 and 2314) as illustrated in FIG. 23B, the processor 1210 sets the operating mode of the optical sensor 1262 to a sleep mode and the operating mode of the magnetic sensor 1264 to an active mode. Accordingly, the electronic device may reduce the power consumption required for detecting the rotation parameter of the rotating body.

According to various embodiments of the present disclosure, the electronic device may also be set to an adaptive UI mode in which the operating modes of the rotation recognition units are adaptively set based on an application program or the service property of an application program.

Figure 24:
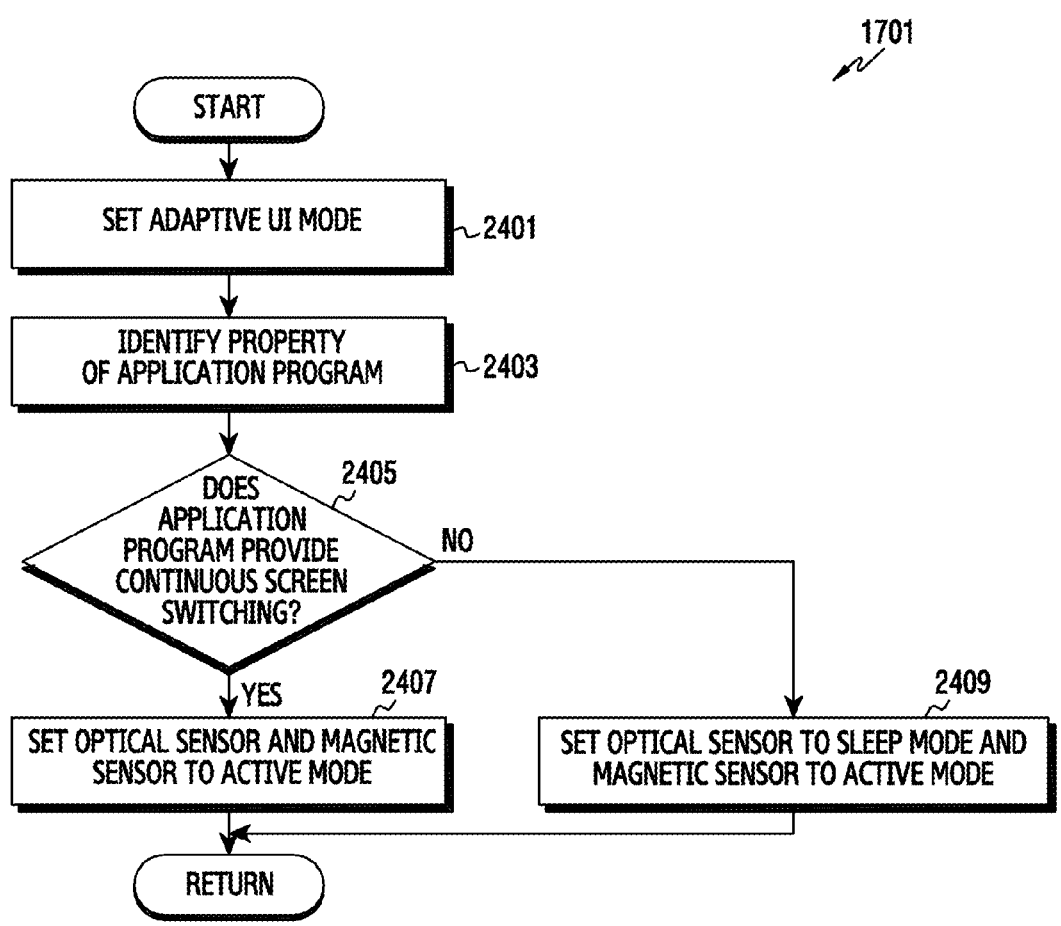
FIG. 24 is a flowchart illustrating a process of determining the operating modes of rotation recognition units based on an adaptive UI mode in an electronic device according to various embodiments of the present disclosure.

FIG. 24 is a flowchart illustrating a process of determining the operating modes of rotation recognition units in an adaptive UI mode in an electronic device according to various embodiments of the present disclosure. Hereinafter, determining the operating modes of the rotation recognition units in operation 1701 of FIG. 17 will be described.

Referring to FIG. 24, in operation 2401, the electronic device (e.g., the electronic device 101A, 201A, 400, or 1200) sets the UI mode to an adaptive UI mode. For example, the processor 1210 may set the adaptive UI mode using input information detected through the input module 1240. For example, the processor 1210 may identify an adaptive UI mode that is basically set for the electronic device.

In operation 2403, the electronic device identifies the property of the running application program. For example, the processor 1210 may identify a pre-defined setting variable or the type of application program among the elements of the application program.

In operation 2405, based on the property of the application program, the electronic device identifies whether the corresponding application program requires continuous screen switching (e.g., UI control).

When it is identified that the application programs requires the continuous screen switching (e.g., UI control), the electronic device sets the operating modes of the optical sensor 1262 and the magnetic sensor 1264 to an active mode for the continuous screen control in operation 2407.

When it is identified that the application program does not require the continuous screen switching, the electronic device sets the operating mode of the optical sensor 1262 to a sleep mode and the operating mode of the magnetic sensor 1264 to an active mode in order to reduce power consumption in operation 2409.

Figure 25:
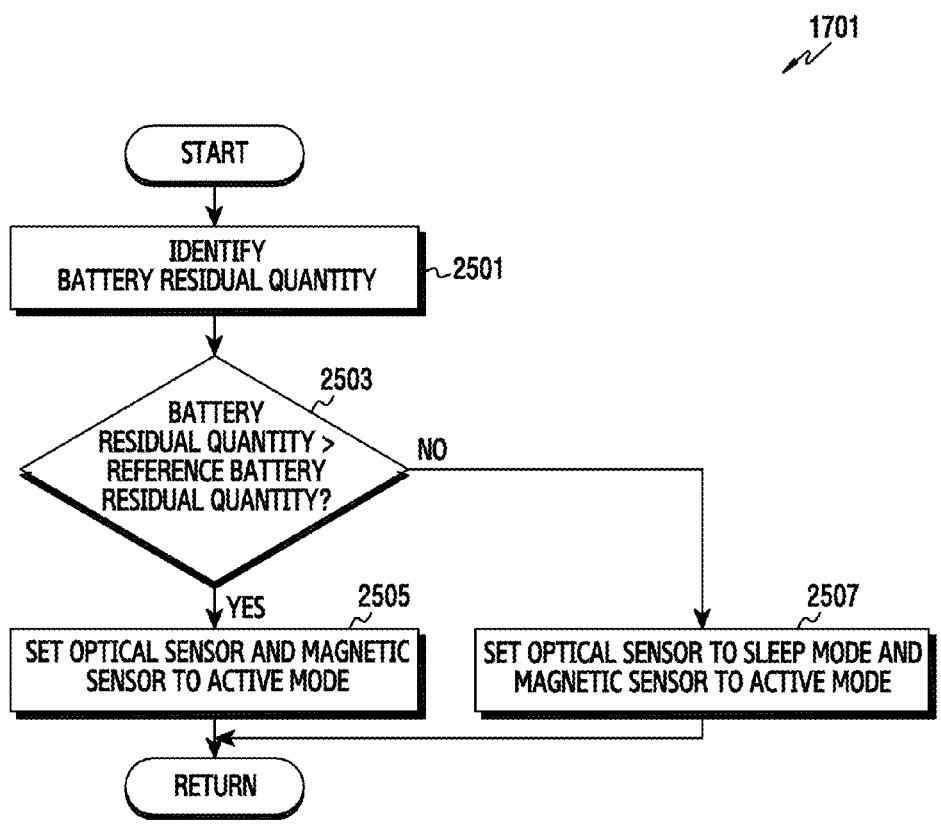
FIG. 25 is a flowchart illustrating a process of determining the operating modes of rotation recognition units based on the battery residual quantity of an electronic device according to various embodiments of the present disclosure.

FIG. 25 is a flowchart illustrating a process of determining the operating modes of rotation recognition units based on the battery residual quantity of an electronic device according to various embodiments of the present disclosure. Hereinafter, determining the operating modes of the rotation recognition units in operation 1701 of FIG. 17 will be described.

Referring to FIG. 25, in operation 2501, the electronic device (e.g., the electronic device 101A, 201A, 400, or 1200) identifies the battery residual quantity while the electronic device is operating. For example, in cases where a battery residual quantity identification event occurs, the electronic device may identify the battery residual quantity. For example, the battery residual quantity identification event may periodically occur.

In operation 2503, the electronic device identifies whether the battery residual quantity is greater than a reference battery residual quantity. For example, the reference battery residual quantity is a reference value for setting the operating modes of the optical sensor 1262 and the magnetic sensor 1264, and may be changed based on at least one of the type of electronic device and the property of an application program that is executed in the electronic device.

In cases where the battery residual quantity is greater than the reference battery residual quantity, the electronic device sets the operating modes of the optical sensor 1262 and the magnetic sensor 1264 to an active mode in operation 2505.

In cases where the battery residual quantity is less than or equal to the reference battery residual quantity, the electronic device sets the operating mode of the optical sensor 1262 to a sleep mode and the operating mode of the magnetic sensor 1264 to an active mode in order to reduce the power consumption, required for detecting the rotation parameter of the rotating body in operation 2507.

According to various embodiments of the present disclosure, in cases where the electronic device is set to an adaptive UI mode, the electronic device may adaptively set the operating modes of the rotation recognition units based on the battery residual quantity as illustrated in FIG. 25.

Figure 26:
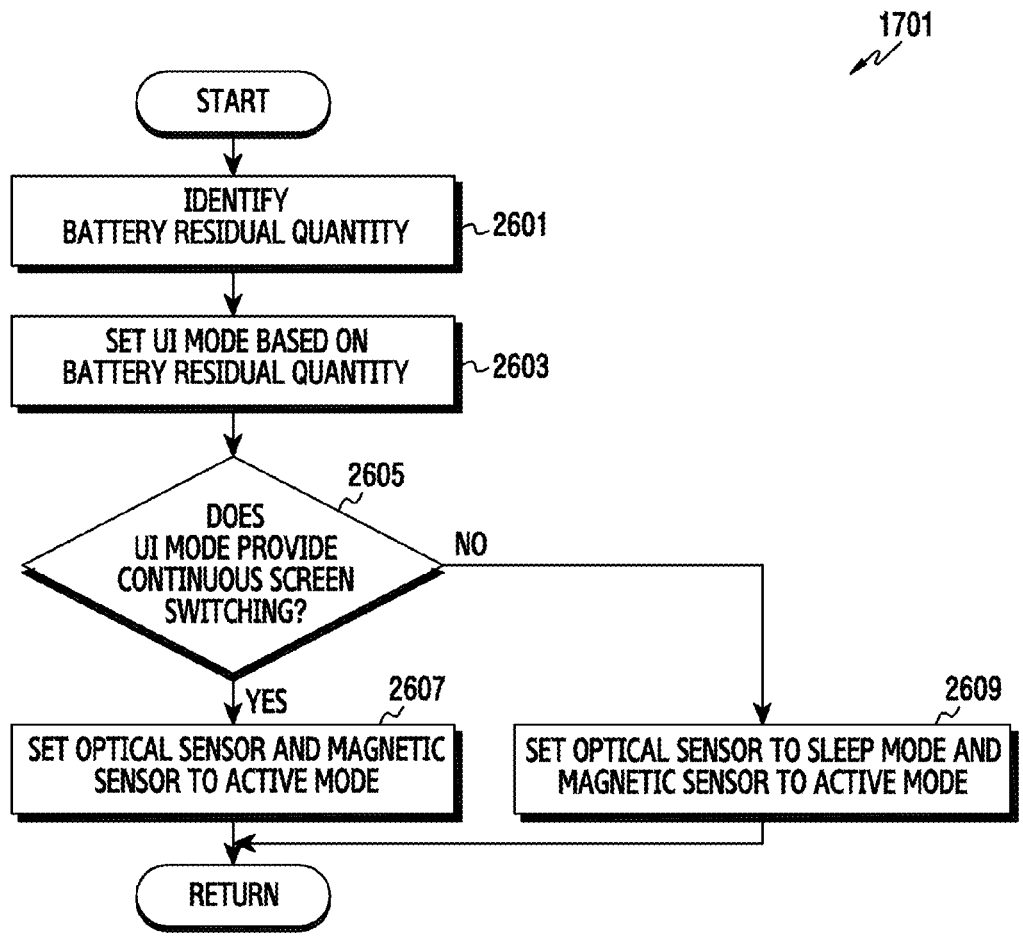
FIG. 26 is a flowchart illustrating a process of determining the operating modes of rotation recognition units based on a UI mode that corresponds to the battery residual quantity of an electronic device according to various embodiments of the present disclosure.

FIG. 26 is a flowchart illustrating a process of determining the operating modes of rotation recognition units based on a UI mode that corresponds to the battery residual quantity of an electronic device according to various embodiments of the present disclosure. Hereinafter, determining the operating modes of the rotation recognition units in operation 1701 of FIG. 17 will be described by using screen configurations illustrated in FIGS. 27A and 27B.

Referring to FIG. 26, in operation 2601, the electronic device (e.g., the electronic device 101A, 201A, 400, or 1200) identifies the battery residual quantity while the electronic device is operating.

Figure 27A:
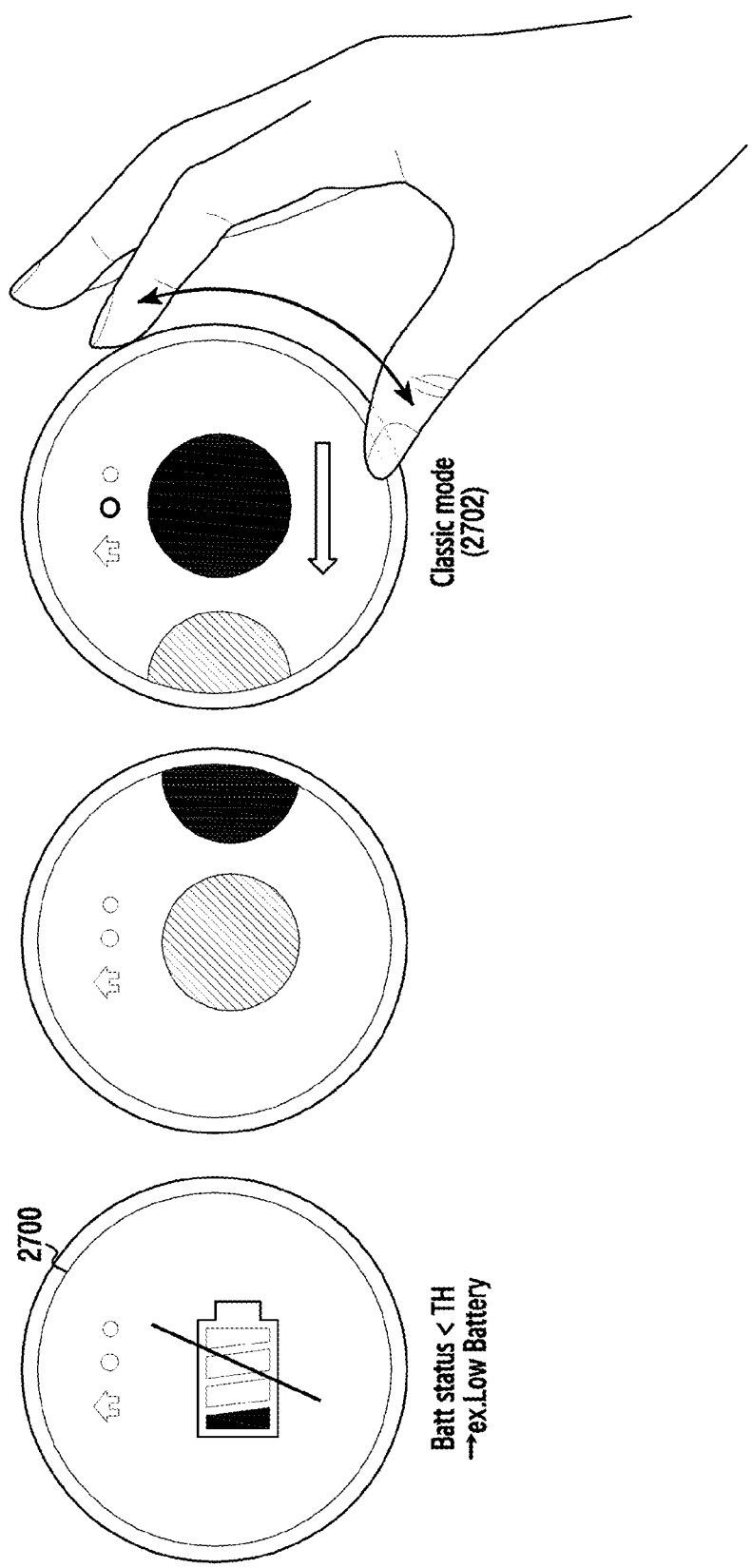
FIGS. 27A and 27B illustrate screen configurations of UI modes that correspond to the battery residual quantity according to various embodiments of the present disclosure.
Figure 27B:
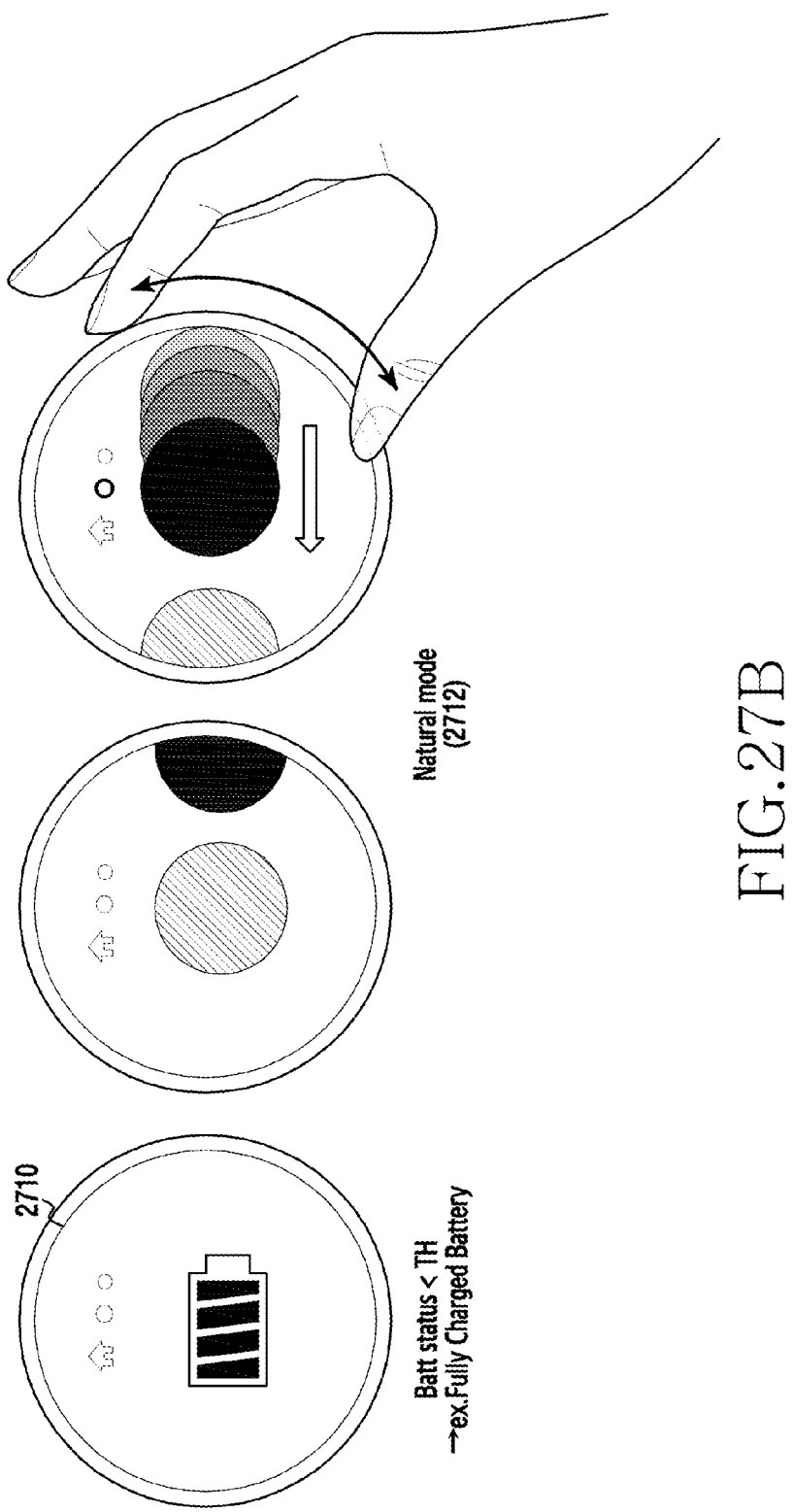

In operation 2603, the electronic device sets the UI mode thereof based on the battery residual quantity thereof. For example, in cases where the battery residual quantity of the electronic device reduces to a reference battery residual quantity or less (2700) as illustrated in FIG. 27A, the processor 1210 may change the UI mode to a second mode (2702) in order to reduce the power consumption of the electronic device. For example, in cases where the battery residual quantity of the electronic device is greater than the reference battery residual quantity (2710) as illustrated in FIG. 27B, the processor 1210 may change the UI mode to a first mode (2712).

In operation 2605, the electronic device identifies whether the UT mode thereof (the UI mode that has been set in operation 2603) requires continuous screen switching (e.g., UI control).

When it is identified that the UI mode of the electronic device requires the continuous screen switching (e.g., UI control), the electronic device sets the operating modes of the optical sensor 1262 and the magnetic sensor 1264 to an active mode for the continuous UI control (e.g., switching a screen or moving an object) in operation 2607.

When it is identified that the UI mode of the electronic device does not require the continuous screen switching, the electronic device sets the operating mode of the optical sensor 1262 to a sleep mode and the operating mode of the magnetic sensor 1264 to an active mode in order to reduce the power consumption required for detecting the rotation parameter of the rotating body in operation 2609.

Figure 28:
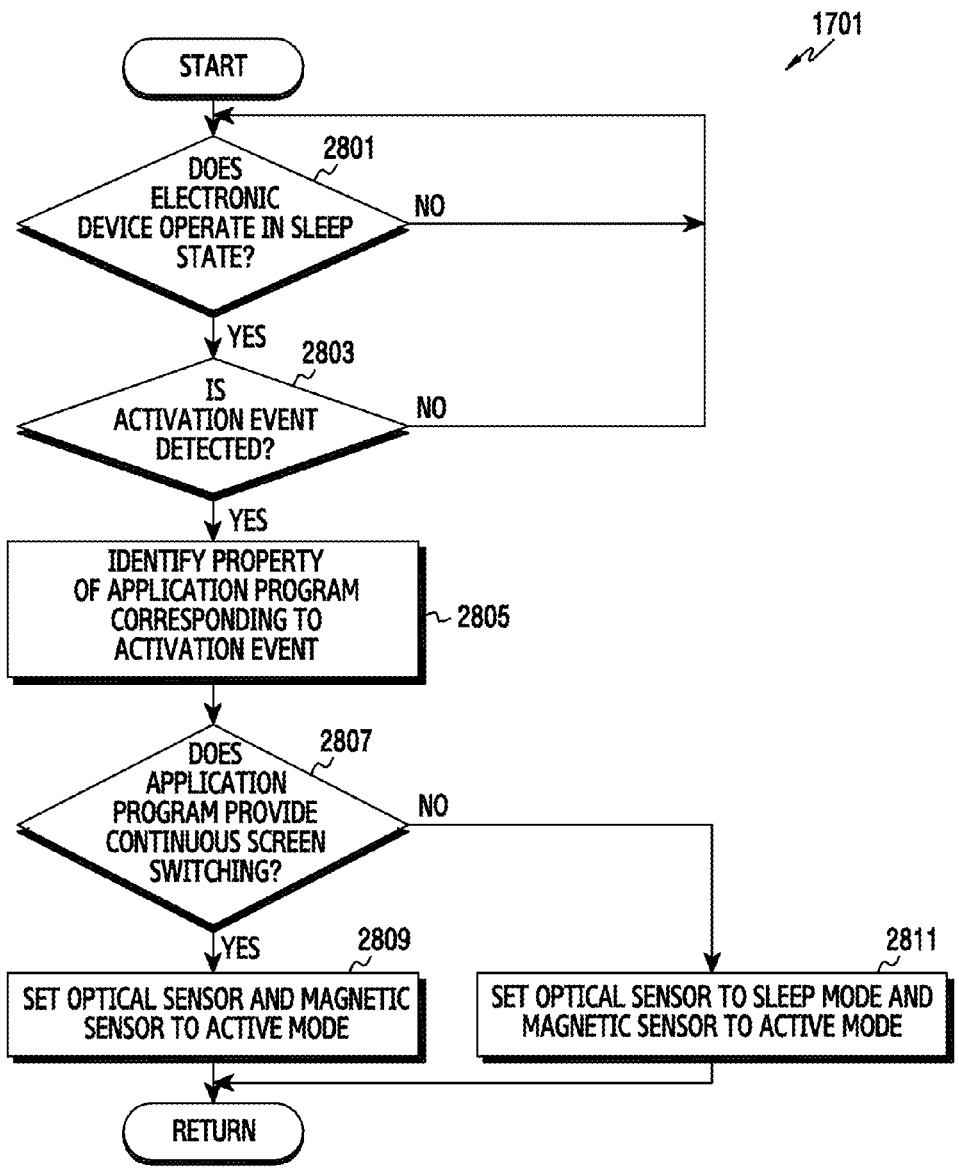
FIG. 28 is a flowchart illustrating a process of determining the operating modes of rotation recognition units based on the property of an application program that corresponds to an activation event in an electronic device according to various embodiments of the present disclosure.

FIG. 28 is a flowchart illustrating a process of determining the operating modes of rotation recognition units based on the property of an application program that corresponds to an activation event in an electronic device according to various embodiments of the present disclosure. Hereinafter, determining the operating modes of the rotation recognition units in operation 1701 of FIG. 17 will be described by using screen configurations illustrated in FIGS. 29A and 29B.

Figure 29A:
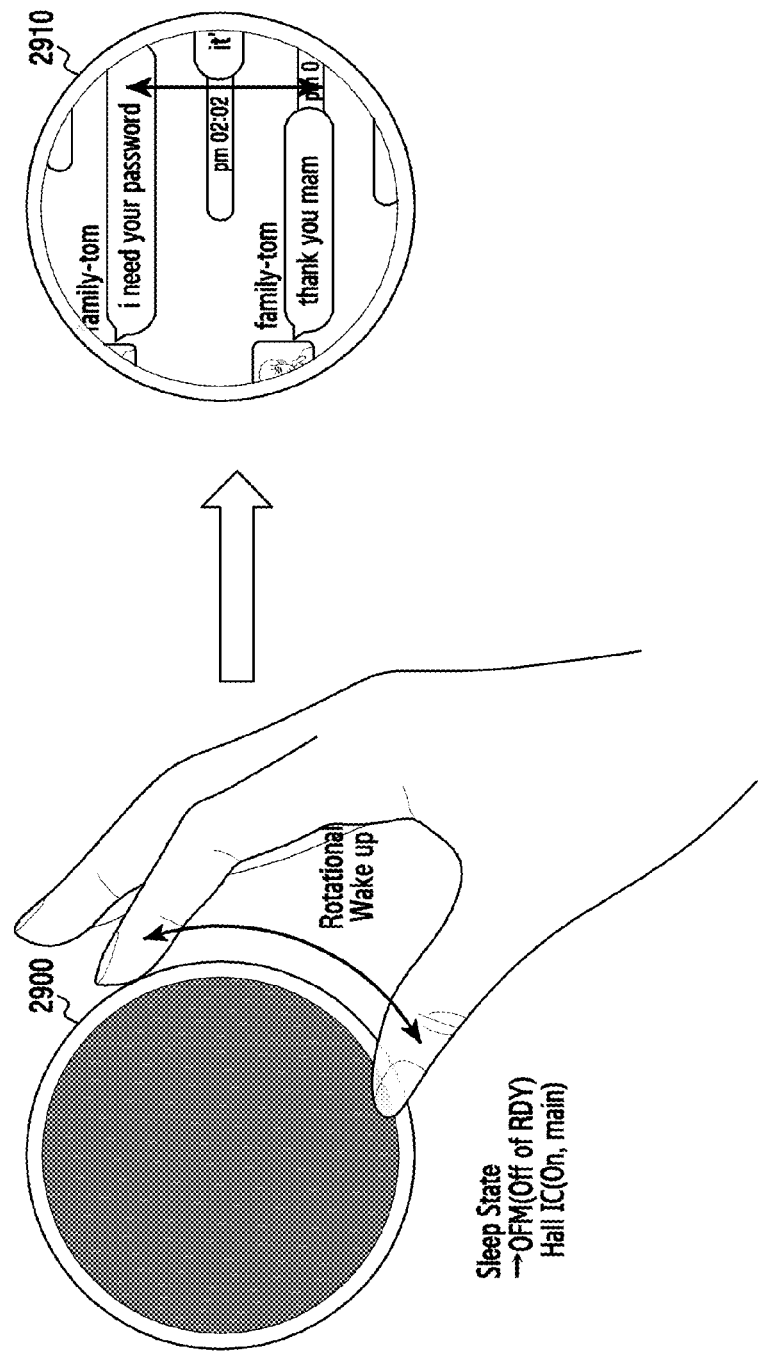
FIGS. 29A and 29B illustrate screen configurations of application programs that correspond to activation events according to various embodiments of the present disclosure.
Figure 29B:
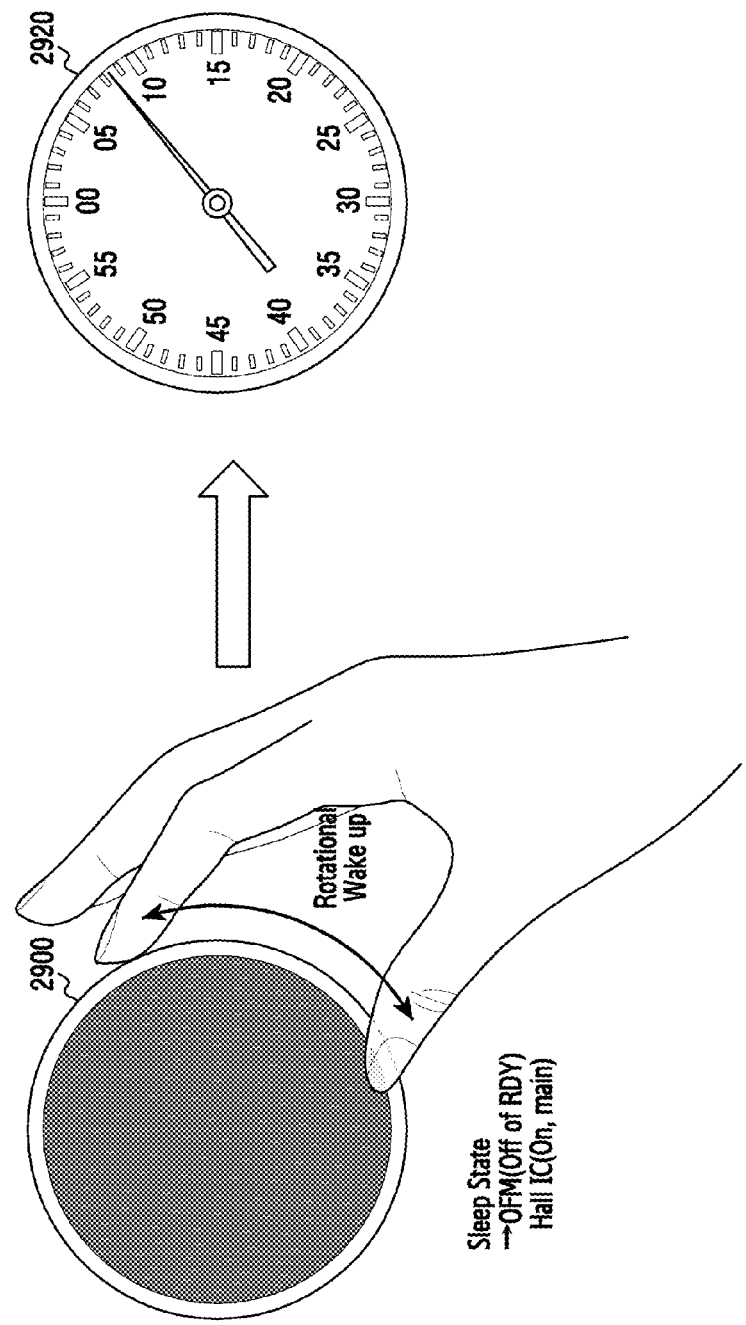

Referring to FIG. 28, in operation 2801, the electronic device (e.g., the electronic device 101A, 201A, 400, or 1200) identifies whether the electronic device operates in a sleep state. For example, in cases where the electronic device operates in the sleep state, the processor 1210 may deactivate the display 1230 (2900) as illustrated in FIGS. 29A and 29B. The processor 1210 may set the operating mode of the optical sensor 1262 to a sleep mode and the operating mode of the magnetic sensor 1264 to an active mode in order to reduce the power consumption required for detecting the rotating parameter of the rotating body. For example, in cases where the electronic device 1200 includes a plurality of magnetic sensors 1264, the processor 1210 may set one of the magnetic sensors 1264 to an active mode and the rest of the magnetic sensors 1264 to a sleep mode.

When it is identified that the electronic device operates in the sleep state, the electronic device identifies whether an activation event is detected in operation 2803. For example, the electronic device may identify whether the rotation of the rotating body is detected through the magnetic sensor 1264. For example, the electronic device may identify whether input information is detected through the input module 1240. For example, the electronic device may identify whether service information (e.g., a message or call reception information) is received from another electronic device in which a communication connection has been established.

When it is identified that the electronic device does not operate in the sleep state in operation 2801, or when it is identified that the activation event is not detected in the sleep state in operation 2803, the electronic device identifies whether the electronic device operates in the sleep state in operation 2801 again.

When it is identified that the activation event is detected in the sleep state, the electronic device identifies the property of an application program that corresponds to the activation event in operation 2805. For example, the processor 1210 may identify the property of an application program to be executed when the activation event occurs. The application program to be executed may include at least one of the preset application program to be executed when the activation event for the electronic device occurs and the application program that was being executed when the electronic device changed to the sleep state.

In operation 2807, based on the property of the application program, the electronic device identifies whether the corresponding application program requires continuous screen switching (e.g., UI control).

When it is identified that the application program requires the continuous screen switching (e.g., UI control), the electronic device sets the operating modes of the optical sensor 1262 and the magnetic sensor 1264 to an active mode in operation 2809. For example, in cases where the electronic device executes a message application that requires continuous screen switching, such as a scroll, as illustrated in FIG. 29A (2910), the processor 1210 may set the operating modes of the optical sensor 1262 and the magnetic sensor 1264 to an active mode.

When it is identified that the application program does not require the continuous screen switching, the electronic device sets the operating mode of the optical sensor 1262 to a sleep mode and the operating mode of the magnetic sensor 1264 to an active mode in operation 2811. For example, in cases where the electronic device executes a clock application that requires discontinuous screen switching in units of seconds or minutes as illustrated in FIG. 29B (2920), the processor 1210 may set the operating mode of the optical sensor 1262 to a sleep mode and the operating mode of the magnetic sensor 1264 to an active mode.

Figure 30:
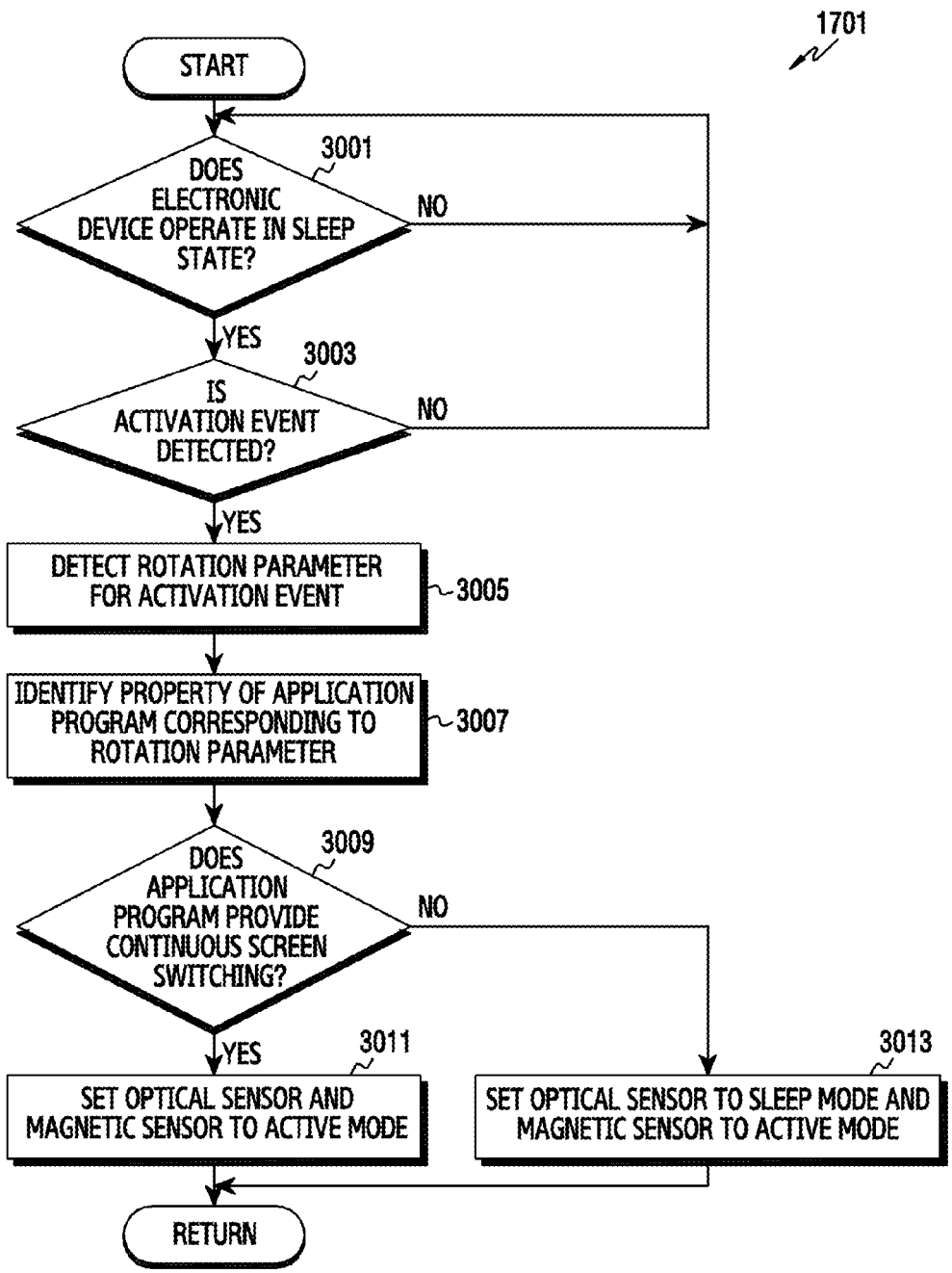
FIG. 30 is a flowchart illustrating a process of determining the operating modes of rotation recognition units based on the property of an application program that corresponds to an activation event in an electronic device according to various embodiments of the present disclosure.

FIG. 30 is a flowchart illustrating a process of determining the operating modes of rotation recognition units based on the property of an application program that corresponds to an activation event in an electronic device according to various embodiments of the present disclosure. Hereinafter, determining the operating modes of the rotation recognition units in operation 1701 of FIG. 17 will be described.

Referring to FIG. 30, in operation 3001, the electronic device (e.g., the electronic device 101A, 201A, 400, or 1200) identifies whether the electronic device operates in a sleep state. For example, the processor 1210 may identify whether the electronic device operates in the sleep state so that the display 1230 is deactivated.

When it is identified that the electronic device operates in the sleep state, the electronic device identifies whether an activation event corresponding to the rotation of the rotating body is detected in operation 3003. For example, the electronic device may identify whether the rotation of the rotating body is detected through the magnetic sensor 1264.

When it is identified that the electronic device does not operate in the sleep state in operation 3001, or when it is identified that the activation event is not detected in the sleep state in operation 3003, the electronic device identifies whether the electronic device operates in the sleep state in operation 3001 again.

When it is identified that the activation event is detected in the sleep state, the electronic device detects the rotation parameter of the rotating body for the activation event in operation 3005.

In operation 3007, the electronic device identifies the property of an application program that corresponds to the rotation parameter. For example, the processor 1210 may select an application program predefined to correspond to the rotation parameter of the rotating body for the activation event among the application programs installed in the electronic device. The processor 1210 may identify the property of the predefined application program. The rotation parameter may include at least one of the direction, speed, and amount of rotation of the rotating body and the rotated position thereof.

In operation 3009, based on the property of the application program, the electronic device identifies whether the corresponding application program requires continuous screen switching (e.g., UI control).

When it is identified that the application program requires the continuous screen switching (e.g., UI control), the electronic device sets the operating modes of the optical sensor 1262 and the magnetic sensor 1264 to an active mode in operation 3011.

When it is identified that the application program does not require the continuous screen switching, the electronic device sets the operating mode of the optical sensor 1262 to a sleep mode and the operating mode of the magnetic sensor 1264 to an active mode in operation 3013.

According to various embodiments of the present disclosure, the electronic device may identify the service property of the application program that corresponds to the rotation parameter of the rotating body for the activation event. The electronic device may set the operating modes of the respective rotation recognition units (e.g., the optical sensor 1262 and the magnetic sensor 1264) based on the service property of the application program that corresponds to the rotation parameter.

Figure 31:
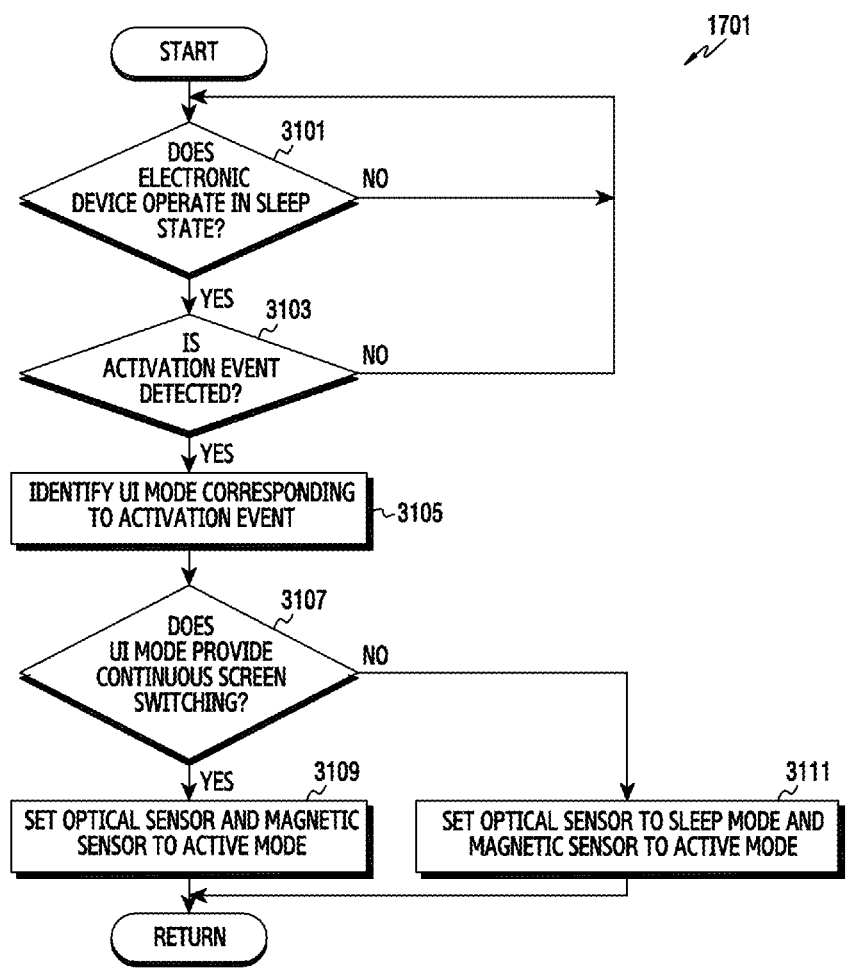
FIG. 31 is a flowchart illustrating a process of determining the operating modes of rotation recognition units based on a UI mode that corresponds to an activation event in an electronic device according to various embodiments of the present disclosure.

FIG. 31 is a flowchart illustrating a process of determining the operating modes of rotation recognition units based on a UI mode that corresponds to an activation event in an electronic device according to various embodiments of the present disclosure. Hereinafter, determining the operating modes of the rotation recognition units in operation 1701 of FIG. 17 will be described.

Referring to FIG. 31, in operation 3101, the electronic device (e.g., the electronic device 101A, 201A, 400, or 1200) identifies whether the electronic device operates in a sleep state.

When it is identified that the electronic device operates in the sleep state, the electronic device identifies whether an activation event is detected in operation 3103. For example, the electronic device may identify whether input information for the activation event is detected through the magnetic sensor 1264 or the input module 1240. For example, the electronic device may identify whether service information is received from another electronic device in which a communication connection is established through the communication module 1250.

When it is identified that the electronic device does not operate in the sleep state (operation 3101), or when it is identified that the activation event is not detected in the sleep state (operation 3103), the electronic device identifies whether the electronic device operates in the sleep state in operation 3101 again.

When it is identified that the activation event is detected in the sleep state, the electronic device identifies a UI mode that corresponds to the activation event in operation 3105. For example, the processor 1210 may identify the UI mode that has been set before the change of the electronic device to the sleep state.

In operation 3107, the electronic device identifies whether the UI mode of the electronic device requires continuous UI control (e.g., switching a screen or moving an object).

When it is identified that the UI mode of the electronic device requires the continuous UI control, the electronic device sets the operating modes of the optical sensor 1262 and the magnetic sensor 1264 to an active mode in operation 3109.

When it is identified that the UI mode of the electronic device does not require the continuous UI control, the electronic device sets the operating mode of the optical sensor 1262 to a sleep mode and the operating mode of the magnetic sensor 1264 to an active mode in operation 3111.

The electronic device, according to the various embodiments of the present disclosure, may adaptively set the operating mode of the optical sensor 1262 based on the battery residual quantity of the electronic device when the activation event occurs. For example, in cases where the battery residual quantity of the electronic device is greater than a reference battery residual quantity, the processor 1210 may set the operating mode of the optical sensor 1262 to an active mode when the activation event occurs. For example, in cases where the battery residual quantity of the electronic device is less than or equal to the reference battery residual quantity, the processor 1210 may maintain the optical sensor 1262 in the sleep mode when the activation event occurs.

Figure 32:
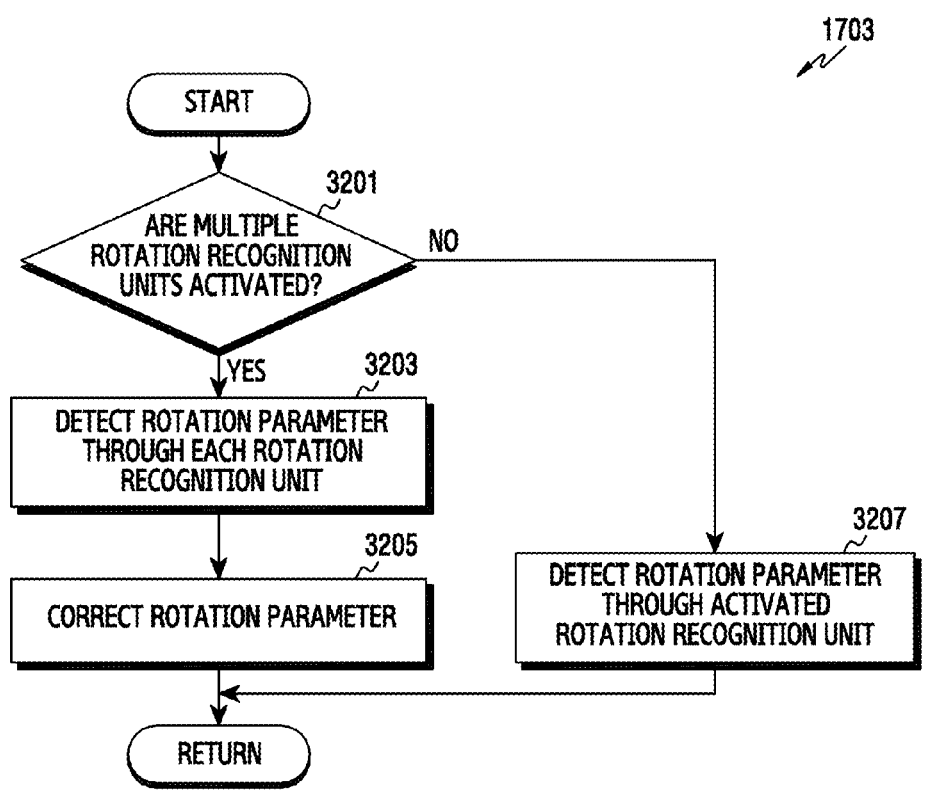
FIG. 32 is a flowchart illustrating a process of detecting a rotation parameter of a rotating body based on the operating modes of rotation recognition units in an electronic device according to various embodiments of the present disclosure.

FIG. 32 is a flowchart illustrating a process of detecting a rotation parameter of a rotating body based on the operating modes of rotation recognition units in an electronic device according to various embodiments of the present disclosure. Hereinafter, determining the operating modes of the rotation recognition units in operation 1703 of FIG. 17 will be described.

Referring to FIG. 32, in operation 3201, the electronic device (e.g., the electronic device 101A, 201A, 400, or 1200) identifies whether a plurality of rotation recognition units included in the electronic device are in an activated state. For example, the processor 1210 may identify whether the optical sensor 1262 and the magnetic sensor 1264 have been set to an active mode.

When it is identified that the plurality of rotation recognition units are in the activated state, the electronic device may detect the rotating parameter of the rotating body through each rotation recognition unit in operation 3203. For example, the processor 1210 may detect the rotation parameter of the rotating body through the optical sensor 1262 and the magnetic sensor 1264.

In operation 3205, the electronic device may correct the rotation parameter detected through the main rotation recognition unit among the plurality of rotation recognition units by using the rotation parameter detected through at least one auxiliary rotation recognition unit.

In cases where one rotation recognition unit is in an activated state, the electronic device, in operation 3207, detects the rotating parameter of the rotating body through the rotation recognition unit that is in the activated state. For example, the processor 1210 may detect the rotation parameter of the rotating body by using one of the optical sensor 1262 and the magnetic sensor 1264, which is in an activated state.

The electronic device may provide a service that corresponds to the rotation parameter that has been corrected in operation 3205 or the rotation parameter that has been detected in operation 3207.

According to various embodiments of the present disclosure, a method of operating an electronic device may include identifying at least one of the state of the electronic device and an application program that is being operated in the electronic device, wherein the electronic device includes an outer housing, a rotary member disposed to be adjacent to, or to be brought into at least partial contact with the housing, a first sensor that detects the rotation of the rotary member relative to the housing through a first physical change, and a second sensor that detects the rotation of the rotary member relative to the housing through a second physical change, and selectively controlling the operation of the first sensor and/or the second sensor based on at least one of the state of the electronic device and the application program.

In various embodiments of the present disclosure, the controlling of the operation of the first sensor and/or the second sensor may include deactivating one of the first and second sensors at least partially based on whether the electronic device is in a deactivated or activated state, at least one of the type, state, and property of the application program, the battery residual quantity of the electronic device, and whether the electronic device provides a continuous graphic effect.

In various embodiments of the present disclosure, the method may further include changing an image displayed on a display at least partially based on a signal received from the first sensor and/or the second sensor.

In various embodiments of the present disclosure, the method may further include correcting a rotation parameter of the rotary member detected through the first sensor by using a rotation parameter of the rotary member detected through the second sensor when the first and second sensors are in an activated state.

In various embodiments of the present disclosure, the method may further include providing a service corresponding to the corrected rotation parameter of the rotary member.

According to various embodiments of the present disclosure, a method of operating an electronic device may include identifying at least one of the state of the electronic device and an application program that is being operated in the electronic device, wherein the electronic device includes an outer housing, a rotary member disposed to be adjacent to, or to be brought into at least partial contact with, the housing, and a plurality of sensors that detect the rotation of the rotary member relative to the housing through physical changes and selectively controlling the operation of at least a part of the sensors based on at least one of the state of the electronic device and the application program.

According to various embodiments of the present disclosure, a method of operating an electronic device may include detecting the rotation of a rotary member through at least one of first and second sensors in the electronic device, wherein the electronic device includes an outer housing, the rotary member disposed to be adjacent to, or to be brought into at least partial contact with, the housing, the first sensor that detects the rotation, of the rotary member relative to the housing through a first physical change, and the second sensor that detects the rotation of the rotary member relative to the housing through a second physical change, activating the electronic device in response to the detection of the rotation of the rotary member, and selectively controlling the operation of the first sensor and/or the second sensor based on at least one of the operating mode of the electronic device and an application program that corresponds to the activation.

In various embodiments of the present disclosure, the controlling of the operation of the first sensor and/or the second sensor may include deactivating one of the first and second sensors at least partially based on at least one of the type, state, and property of the application program that is executed in response to the activation of the electronic device.

In various embodiments of the present disclosure, the controlling of the operation of the first sensor and/or the second sensor may include deactivating one of the first and second sensors based on whether the operating mode corresponding to the activation of the electronic device provides a continuous graphic effect.

In various embodiments of the present disclosure, the controlling of the operation of the first sensor and/or the second sensor may include determining at least one of the operating mode and the application program that correspond to the activation of the electronic device based on a rotation parameter of the rotary member that is detected through at least one of the first and second sensors and selectively controlling the operation of the first sensor and/or the second sensor based on at least one of the determined operating mode and the application program.

Although the wrist-mounted wearable electronic device and the rotating body having a bezel shape that surrounds the whole display are illustrated, and the descriptions thereof are given in the various embodiments of the present disclosure, the present disclosure is not limited thereto. For example, an electronic device may also include a rotating body that is disposed to be separate from the main display, or is disposed as a part of the main display.

The electronic device that includes the plurality of rotation recognition units (sensors) and the control method thereof, according to various embodiments of the present disclosure, determine the operating modes of the respective rotation recognition units based on the control information according to the operation of the electronic device (e.g., the state of the electronic device, the property, state, or type of the application program, the UI mode (operating mode), the battery residual quantity, and the active mode), thereby reducing power consumption required for the rotation recognition units while maintaining the usability of the rotation recognition units for the application program and the user interface.

The term "module" as used herein may, for example, refer to a unit including one of hardware, software, and firmware or a combination of two or more of them. The term "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations.

According to various embodiments of the present disclosure, at least some of the devices (for example, modules or functions thereof) or the methods (for example, operations) may be implemented by a command stored in a computer-readable storage medium in a programming module form. The command, when executed by a processor (e.g., the processor 120A), may cause the one or more processors to execute the function corresponding to the instruction. The computer-readable storage medium may be, for example, the memory 130A.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high level language codes, which may be executed in a computer by using an interpreter, as well as machine codes made by a compiler. The aforementioned hardware electronic device may be configured to operate as one or more software modules in order to perform the operation of the present disclosure, and vice versa.

Any of the modules or programming modules according to various embodiments of the present disclosure may include at least one of the above described elements, exclude some of the elements, or further include additional elements. The operations performed by the modules, programming modules, or other elements may be executed in a sequential, parallel, repetitive, or heuristic manner. Further, some operations may be executed according to another order or may be omitted, or other operations may be added.

Various embodiments of the present disclosure disclosed herein are provided merely to describe technical details of the present disclosure and to help the understanding of the present disclosure, and do not limit the scope of the present disclosure. Therefore, the scope of the present disclosure is defined not by the detailed description of the present disclosure but by the appended claims and their equivalents, and all differences within the scope will be construed as being included in the present disclosure.

What is claimed is:

1. An electronic device comprising:
an outer housing:
a rotary member disposed adjacent to, or at least in partial contact with, the housing;
a first sensor that detects rotation of the rotary member relative to the housing through a first physical change;
a second sensor that detects rotation of the rotary member relative to the housing through a second physical change;
a battery disposed in the housing;
a processor electrically connected to the battery, the first sensor, and the second sensor; and
a memory electrically connected to the processor,
wherein the memory stores instructions that, when executed, cause the processor to selectively control the operation of at least one of the first and second sensor based on at least one of the state of the electronic device and an application program that is executed by the processor.

2. The electronic device of claim 1, wherein the first sensor comprises an optical sensor, and the second sensor comprises a magnetic force detection sensor, and
wherein the first sensor consumes more power than the second sensor.

3. The electronic device of claim 2, wherein the magnetic force detection sensor comprises a plurality of magnetic force detection sensors spaced apart from each other.

4. The electronic device of claim 1, wherein the instructions, when executed, cause the processor to deactivate one of the first and second sensors at least partially based on whether the electronic device is in a deactivated or activated state.

5. The electronic device of claim 1, wherein the instructions, when executed, cause the processor to deactivate one of the first and second sensors at least partially based on at least one of the type, state, and property of the application program executed by the processor.

6. The electronic device of claim 1, wherein the instructions, when executed cause the processor to deactivate one of the first and second sensors at least partially based on the battery residual quantity.

7. The electronic device of claim 1, wherein the instructions, when executed, cause the processor to deactivate one of the first and second sensors based on whether the electronic device provides a continuous graphic effect.

8. The electronic device of claim 1, further comprising:
a display that has a screen, at least a part of which is surrounded by the rotary member, wherein the instructions, when executed, cause the processor to change an image displayed on the display at least partially based on a signal received from at least one of the first sensor and the second sensor.

9. The electronic device of claim 1, wherein the instructions, when executed, cause the processor to correct a rotation parameter of the rotary member detected through the first sensor by using a rotation parameter of the rotary member detected through the second sensor when the first and second sensors are in an activated state and provide a service corresponding to the corrected rotation parameter of the rotary member.

10. The electronic device of claim 9, wherein the rotation parameter comprises at least one of the speed, direction, and amount of rotation of the rotary member and the rotated position thereof.

11. A method of operating an electronic device, comprising:
identifying at least one of the state of the electronic device and an application program that is being executed in the electronic device, wherein the electronic device comprises an outer housing, a rotary member disposed adjacent to, or at least in partial contact with the housing, a first sensor that detects the rotation of the rotary member relative to the housing through a first physical change, and a second sensor that detects the rotation of the rotary member relative to the housing through a second physical change; and
selectively controlling the operation of at least one of the first sensor and the second sensor based on at least one of the state of the electronic device and the application program.

12. The method of claim 11, wherein the first sensor comprises an optical sensor, and the second sensor comprises a magnetic force detection sensor, and
wherein the first sensor consumes more power than the second sensor.

13. The method of claim 11, wherein controlling the operation of at least one of the first sensor and the second sensor comprises deactivating one of the first and second sensors at least partially based on whether the electronic device is in a deactivated or activated state.

14. The method of claim 11, wherein controlling the operation of at least one of the first sensor and the second sensor comprises deactivating one of the first and second sensors at least partially based on at least one of the type, state, and property of the application program.

15. The method of claim 11, wherein controlling the operation of at least one of the first sensor and the second sensor comprises deactivating one of the first and second sensors at least partially based on the battery residual quantity of the electronic device.

16. The method of claim 11, wherein controlling the operation of the first sensor and/or the second sensor comprises deactivating one of the first and second sensors based on whether the electronic device provides a continuous graphic effect.

17. The method of claim 11, further comprising:
changing an image displayed on a display of the electronic device at least partially based on a signal received from the first sensor and/or the second sensor.

18. The method of claim 11, further comprising:
correcting a rotation parameter of the rotary member detected through the first sensor by using a rotation parameter of the rotary member detected through the second sensor when the first and second sensors are in an activated state; and
providing a service corresponding to the corrected rotation parameter of the rotary member.

19. The method of claim 18, wherein the rotation parameter comprises at least one of the speed, direction, and amount of rotation of the rotary member and the rotated position thereof.

20. The method of claim 18, wherein the service corresponding to the rotation parameter comprises at least one of operating a function associated with the corrected rotation parameter of the rotary member, executing an application program, and changing a mode.

* * * * *